(12) United States Patent
Luo et al.

(10) Patent No.: US 12,547,592 B2
(45) Date of Patent: Feb. 10, 2026

(54) APPLICATION COMPRESSION METHOD, APPLICATION DECOMPRESSION METHOD, AND ELECTRONIC DEVICE

(71) Applicant: Huawei Technologies Co., Ltd., Shenzhen (CN)

(72) Inventors: Junqing Luo, Shanghai (CN); Jiaxin Li, Shenzhen (CN); Jing Qian, Shanghai (CN); Shukai Huang, Shanghai (CN); Tianlu He, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/928,806

(22) Filed: Oct. 28, 2024

(65) Prior Publication Data

US 2025/0053544 A1 Feb. 13, 2025

Related U.S. Application Data

(63) Continuation of application No. PCT/CN2023/089053, filed on Apr. 18, 2023.

(30) Foreign Application Priority Data

Apr. 29, 2022 (CN) .......................... 202210474441.X

(51) Int. Cl.
| | | |
|---|---|---|
| G06F 16/00 | (2019.01) | |
| G06F 3/04817 | (2022.01) | |
| G06F 3/0482 | (2013.01) | |
| G06F 3/0484 | (2022.01) | |
| G06F 16/174 | (2019.01) | |

(52) U.S. Cl.
CPC ...... *G06F 16/1744* (2019.01); *G06F 3/04817* (2013.01); *G06F 3/0482* (2013.01); *G06F 3/0484* (2013.01)

(58) Field of Classification Search
CPC .......................... G06F 16/1744; G06F 16/174
See application file for complete search history.

(56) References Cited

U.S. PATENT DOCUMENTS

| | | | | |
|---|---|---|---|---|
| 2014/0123081 | A1* | 5/2014 | Park | G06F 3/04817 |
| | | | | 715/863 |
| 2016/0321373 | A1* | 11/2016 | Chen | G06F 16/9554 |
| 2018/0081517 | A1* | 3/2018 | Luo | G06F 3/0488 |

FOREIGN PATENT DOCUMENTS

| | | |
|---|---|---|
| CN | 101957836 A | 1/2011 |
| CN | 111143300 A | 5/2020 |
| CN | 114003573 A | 2/2022 |

* cited by examiner

*Primary Examiner* — Cheryl Lewis
(74) *Attorney, Agent, or Firm* — Conley Rose, P.C.

(57) ABSTRACT

In an application compression method a user may select, on a user interface based on a requirement of the user, a to-be-compressed application, and then an electronic device responds to an operation of the user, and compresses the selected application to reduce storage space occupied by the application. The user may also select to decompress a compressed application to facilitate subsequent use of the application.

20 Claims, 37 Drawing Sheets

APPLICATION COMPRESSION METHOD, APPLICATION DECOMPRESSION METHOD, AND ELECTRONIC DEVICE

CROSS-REFERENCE TO RELATED APPLICATIONS

This is a continuation of International Patent Application No. PCT/CN2023/089053, filed on Apr. 18, 2023, which claims priority to Chinese Patent Application No. 202210474441.X, filed on Apr. 29, 2022. The disclosures of the aforementioned applications are hereby incorporated by reference in their entireties.

TECHNICAL FIELD

This disclosure relates to the field of terminal technologies to an application compression method, an application decompression method, and an electronic device.

BACKGROUND

Electronic devices are used more frequently, and as use time increases, applications generate more data. Consequently, storage space of the electronic devices becomes smaller.

A mobile phone is used as an example. Currently, available space of mobile phones of most users is less than 10% after the mobile phones are generally used for two years, affecting normal use of the users and causing poor user experience. Therefore, how to save storage space of electronic devices becomes a problem to be resolved.

SUMMARY

This disclosure provides an application compression method, an application decompression method, and an electronic device, to improve storage space utilization of the electronic device and improve user experience.

According to a first aspect, this disclosure provides an application compression method. The method includes display of a first interface, where the first interface includes an application icon and a compression option, then the electronic device responds to a first operation on the first interface, where the first operation is used to select a target application icon on the first interface, and finally the electronic device performs transparent compression on a target application corresponding to the target application icon in response to a second operation performed on the compression option on the first interface.

According to the foregoing technical solution, the user may select, on an interface and based on a requirement of the user, a to-be-compressed application, and then the electronic device compresses the selected application to save storage space of the electronic device, improve storage space utilization, and improve user experience.

In a possible design, the method further includes display of a second interface, where the second interface includes first prompt information, and the first prompt information indicates compression progress of the target application corresponding to the target application icon.

According to the foregoing technical solution, the prompt information of the compression progress is displayed on the interface so that the user can conveniently view the compression progress and learn a compression status of the application in a timely manner. This can improve user experience.

In a possible design, the method further includes display of a third interface, where the third interface includes an application icon of the compressed target application.

According to the foregoing technical solution, after the target application is compressed, the application icon of the compressed target application may be displayed, and the user may determine, based on the displayed application icon, whether an application is compressed.

In a possible design, the method further includes display of a fourth interface in response to an operation on the third interface, where the fourth interface includes a decompression option and the electronic device decompresses the target application in response to a tapping operation performed on the decompression option.

According to the foregoing technical solution, a decompression operation interface may be triggered on the interface including the application icon after compression, and then the target application is decompressed by tapping the decompression option.

In a possible design, the method further includes display of a fifth interface, where the fifth interface includes second prompt information, and the second prompt information indicates decompression progress of the target application.

According to the foregoing technical solution, the prompt information of the decompression progress is displayed on the interface, so that the user can conveniently view the decompression progress and learn a decompression status of the application in a timely manner. This can improve user experience.

In a possible design, the method starts the target application in response to an operation on the third interface and the electronic device displays an application interface of the target application.

For example, the operation may be a tapping operation performed on the target application, and then the electronic device may respond to the tapping operation and start the target application. According to the foregoing technical solution, the application may be decompressed when being started. In this way, the user can quickly start the application without waiting.

In a possible design, the method further includes displaying third prompt information in response to an operation on the third interface, where the third prompt information includes information indicating that the target application is being decompressed, and after the target application is decompressed, the electronic device starts the target application, and displays an application interface of the target application.

According to the foregoing technical solution, when the user starts the target application, the target application may be first decompressed, and after the decompression is completed, the target application is started, and the application interface is displayed.

In a possible design, that the electronic device performs transparent compression on a target application corresponding to the target application icon includes selection of a target file from application files of the target application, and dividing the target file into a plurality of file blocks. The electronic device then selects a corresponding target compression algorithm for each file block of the plurality of file blocks and the electronic device compresses each file block of the plurality of file blocks according to the corresponding target compression algorithm.

According to the foregoing technical solution, a file of the target application may be divided into a plurality of file blocks, and then each file block is compressed, so that sizes of the application files of the target application are reduced, to improve space utilization.

In a possible design, that the electronic device performs transparent compression on a target application corresponding to the target application icon includes obtaining a first file included in the target application, where the first file includes first data. The electronic device compresses the first data in the first file to obtain a second file, where the second file includes first compressed data, and a file name and an extension name of the first file are the same as those of the second file.

According to the foregoing technical solution, when transparent compression is performed on an application, data of the application may be compressed, and file names and file extensions before and after the compression do not change, and the compression process is not perceptible to the application.

In a possible design, that the electronic device decompresses the target application includes obtaining a second file included in the target application, where the second file includes first compressed data of first data, and the first data is data included in a first file in the target application, and the electronic device decompresses the first compressed data in the second file to obtain the first file, where a file name and an extension name of the first file are the same as those of the second file.

According to the foregoing technical solution, when decompression is performed on an application, compressed data may be decompressed, and file names and file extensions before and after the decompression do not change, and the decompression process is not perceptible to the application.

In a possible design, the electronic device changes a compression manner of the target application corresponding to the target application icon in response to an operation performed on the compression option.

According to the foregoing technical solution, the compression manner of the target application may be changed. In this way, the user may adjust the compression manner based on a requirement of the user. This can improve user experience.

According to a second aspect, this disclosure provides an application decompression method applied to an electronic device.

The electronic device displays a fourth interface, where the fourth interface includes a target application icon of a transparently-compressed target application and a decompression option and responds to an operation on the fourth interface, where the operation is used to select the target application icon on the fourth interface, and the electronic device performs transparent decompression on the target application corresponding to the target application icon in response to a tapping operation performed on the decompression option on the fourth interface.

According to the foregoing technical solution, a user may perform transparent decompression on the target application on which transparent compression has been performed. This process is not perceptible to the application.

In a possible design, the method further includes changing a compression manner of the target application corresponding to the target application icon in response to an operation performed on the target application icon.

According to the foregoing technical solution, the user may change the compression manner of the target application. In this way, the user may adjust the compression manner based on a requirement of the user. This can improve user experience.

According to a third aspect, this disclosure provides an electronic device. The electronic device includes a display, one or more processors, one or more memories, one or more sensors, a plurality of applications, and one or more computer programs. The one or more computer programs are stored in the one or more memories, the one or more computer programs include instructions, and when the instructions are invoked and executed by the one or more processors, the electronic device is enabled to perform the method according to any one of the first aspect and the possible designs of the first aspect.

According to a fourth aspect, this disclosure provides an electronic device. The electronic device includes a display, one or more processors, one or more memories, one or more sensors, a plurality of applications, and one or more computer programs. The one or more computer programs are stored in the one or more memories, the one or more computer programs include instructions, and when the instructions are invoked and executed by the one or more processors, the electronic device is enabled to perform the method according to any one of the second aspect and the possible designs of the second aspect.

According to a fifth aspect, this disclosure further provides an electronic device. The electronic device includes modules/units that are configured to perform the method according to any one of the first aspect or the possible designs of the first aspect. The modules/units may be implemented by hardware, or may be implemented by hardware by executing corresponding software.

According to a sixth aspect, this disclosure further provides an electronic device. The electronic device includes modules/units that are configured to perform the method according to any one of the second aspect or the possible designs of the second aspect. The modules/units may be implemented by hardware, or may be implemented by hardware by executing corresponding software.

According to a seventh aspect, this disclosure further provides a computer-readable storage medium. The computer-readable storage medium stores instructions, and when the instructions are run on an electronic device, the electronic device is enabled to perform the method according to any one of the first aspect and the possible designs of the first aspect.

According to an eighth aspect, this disclosure further provides a computer-readable storage medium. The computer-readable storage medium stores instructions, and when the instructions are run on an electronic device, the electronic device is enabled to perform the method according to any one of the second aspect and the possible designs of the second aspect.

According to a ninth aspect, this disclosure further provides a computer program product. When the computer program product runs on an electronic device, the electronic device is enabled to perform the method according to any one of the first aspect of embodiments and the possible designs of the first aspect.

According to a tenth aspect, an embodiment of this disclosure provides a computer program product. When the computer program product runs on an electronic device, the electronic device is enabled to perform the method according to any one of the second aspect of embodiments and the possible designs of the second aspect.

For the foregoing aspects from the third aspect to the tenth aspect and technical effects that can be achieved in the foregoing aspects, refer to the descriptions of the technical effects that can be achieved through the possible solutions in the first aspect or the second aspect. Details are not described herein again.

DESCRIPTION OF EMBODIMENTS

Figure 1:
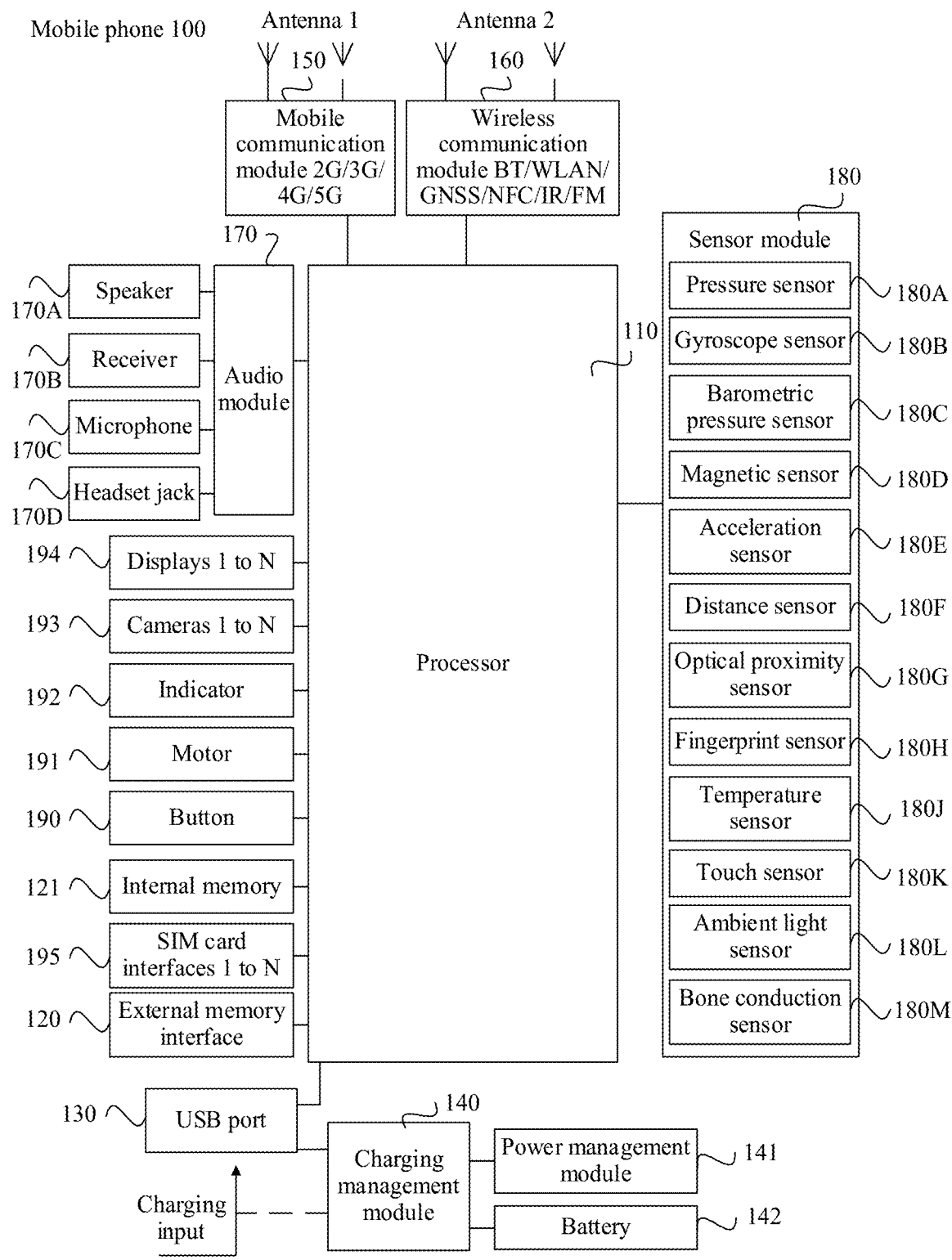
FIG. 1 is a diagram of a structure of an electronic device according to an embodiment.

The following describes technical solutions in embodiments of this disclosure in detail with reference to the accompanying drawings in exemplary embodiments.

The following first describes some terms in the examples of embodiments to facilitate understanding of a person skilled in the art.

1. Application: An application program is referred to as an application for short, and is a software program that can implement one or more functions. Usually, a plurality of applications, for example, a Camera application, a Messaging application, a Mailbox application, a Video application, or a Music application, may be installed in an electronic device. An application mentioned below may be an application installed when an electronic device is delivered from a factory, or may be an application downloaded by a user from a network or obtained by the user from another electronic device during use of the electronic device.

2. Transparent compression: In transparent compression, when an application writes original data to a file system, the file system compresses the data and writes the compressed data to a storage device, such as a universal flash storage (UFS). When an application reads data, the compressed data is first read from the UFS, is decompressed by the file system, and is returned to the application. The transparent compression is used to ensure that compression and decompression are completely transparent to applications. It should be understood that data compression and decompression are not perceptible to the application. For example, a storage format or an extension of data included in the application does not change before and after transparent compression and transparent decompression, and the data included in the application becomes compressed data after the transparent compression, and the application can still directly identify and read the compressed data.

With development of electronic devices and improvement of user requirements, a user installs more applications on a terminal device, for example, a mobile phone, and installation data of these applications occupies a part of storage space. In addition, a large amount of data is generated in a process of using the application, and the data also occupies a large part of the storage space. The storage space of the mobile phone will become smaller as use time increases.

In view of this, this disclosure provides an application compression method. In the method, an application may be selected for compression, to save storage space occupied by the application, improve storage space utilization, and improve user experience.

In addition, in embodiments, "at least one" means one or more, and "a plurality of" means two or more. In addition, it should be understood that in the descriptions, terms such as "first" and "second" are merely used for differentiation and description.

It should be noted that the methods provided in embodiments of this disclosure are applicable to a plurality of electronic devices having a display, such as a mobile phone, a tablet computer, a wearable device (for example, a watch, a band, a smart helmet, or smart glasses), a vehicle-mounted device, an augmented reality (AR) device/a virtual reality (VR) device, a notebook computer, an ultra-mobile personal computer (UMPC), a netbook, and a personal digital assistant (PDA). This is not limited in embodiments of this disclosure. The electronic device in embodiments may be a foldable electronic device, for example, a foldable mobile phone or a foldable tablet computer. This is not limited. In addition, an example embodiment of the electronic device includes but is not limited to an electronic device using iOS®, Android®, Microsoft®, HarmonyOS®, or another operating system.

The following uses the mobile phone as an example to describe a structure of the electronic device.

As shown in FIG. 1, the mobile phone 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the mobile phone 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB port 130 is an interface that conforms to a USB standard specification, and may be a mini USB port, a micro USB port, a USB type-C port, or the like. The USB port 130 may be configured to connect to a charger to charge the mobile phone 100, or may be configured to perform data transmission between the mobile phone 100 and a peripheral device. The charging management module 140 is configured to receive a charging input from the charger. The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the mobile phone 100 may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the mobile phone 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution, including second generation, third generation, fourth generation, fifth generation (2G/3G/4G/5G), or the like, that is applied to the mobile phone 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The wireless communication module 160 may provide a wireless communication solution that is applied to the mobile phone 100 and that includes a wireless local area network (WLAN) (for example, a wireless fidelity (WI-FI) network), BLUETOOTH (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the mobile phone 100 is coupled to the mobile communication module 150, and the antenna 2 is coupled to the wireless communication module 160, so that the mobile phone 100 can communicate with a network and another device by using a wireless communication technology. The wireless communication technology may include a Global System for Mobile Communications (GSM), a general packet radio service (GPRS), code-division multiple access (CDMA), wideband CDMA (WCDMA), time-division synchronous CDMA (TD-SCDMA), Long-Term Evolution (LTE), a 5G mobile communication system, a future communication system like a 6th generation (6G) system, BT, GNSS, WLAN, NFC, FM, an IR technology, and/or the like. The GNSS may include a global positioning system ( ) a global navigation satellite system (GLONASS), a BEIDOU navigation satellite system (BDS), a quasi-zenith satellite system (QZSS), and/or a satellite-based augmentation system (SBAS).

The display 194 is configured to display a display interface of an application, and the like. The display 194 includes a display panel. The display panel may be a liquid-crystal display (LCD), an organic light-emitting diode (OLED), an active-matrix organic light-emitting diode (AMOLED), a flexible light-emitting diode (FLED), a mini-light-emitting diode (LED), a micro-light-emitting diode (LED), a micro-OLED, a quantum dot light-emitting diode (QLED), or the like. In some embodiments, the mobile phone 100 may include one or N displays 194, where N is a positive integer greater than 1. In embodiments, the display 194 may be configured to display a plurality of application icons, a compression manner, and the like. A user may select, on an interface, a to-be-compressed application and a compression manner of the application.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage region and a data storage region. The program storage region may store an operating system, software code of at least one application (iQIYI application or a WeChat application), and the like. The data storage region may store data (for example, an image and a video) and the like generated in a process of using the mobile phone 100. In addition, the internal memory 121 may include a high-speed random-access memory (RAM), or may include a non-volatile memory, for example, at least one magnetic disk storage device, a flash memory device, or a universal flash storage (UFS).

The external memory interface 120 may be configured to connect to an external storage card like a micro SD card, to extend a storage capability of the mobile phone 100. The external storage card communicates with the processor 110 through the external memory interface 120, to implement a data storage function. For example, files such as pictures or videos are stored in the external storage card.

The mobile phone 100 may implement an audio function like music playing or recording by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed in the display 194. The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes).

The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes). The gyroscope sensor 180B may be configured to implement image stabilization during image shooting. For example, when a shutter is pressed, the gyroscope sensor 180B detects an angle at which the mobile phone 100 jitters, calculates, based on the angle, a distance for which a lens module needs to compensate, and allows the lens to cancel the jitter of the mobile phone 100 through reverse motion, to implement image stabilization. The gyroscope sensor 180B may also be used in a navigation scenario and a somatic game scenario.

The barometric pressure sensor 180C is configured to measure barometric pressure. In some embodiments, the mobile phone 100 calculates an altitude through the barometric pressure measured by the barometric pressure sensor 180C, to assist in positioning and navigation. The magnetic sensor 180D includes a Hall sensor. The mobile phone 100 may detect opening and closing of a flip cover by using the magnetic sensor 180D. In some embodiments, when the mobile phone 100 is a flip phone, the mobile phone 100 may detect opening and closing of a flip cover based on the magnetic sensor 180D. Further, a feature such as automatic unlocking upon opening of the flip cover is set based on a detected opening or closing state of the flip cover. The acceleration sensor 180E may detect a magnitude of acceleration of the mobile phone 100 in various directions (usually on three axes). When the mobile phone 100 is static, a value and a direction of gravity may be detected. The acceleration sensor may be further configured to identify a posture of an electronic device, and is used in an application, for example, switching between a landscape mode and a portrait mode or a pedometer.

The distance sensor 180F is configured to measure a distance. The mobile phone 100 may measure a distance by using infrared light or a laser. In some embodiments, in an image shooting scenario, the mobile phone 100 may measure a distance by using the distance sensor 180F, to implement quick focusing. The optical proximity sensor 180G may include, for example, an LED and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear for a call, to automatically turn off a screen for power saving. The optical proximity sensor 180G may also be used in a flip cover mode or a pocket mode to automatically perform screen unlocking or locking.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during image shooting. The ambient light sensor 180L may also cooperate with the optical proximity sensor 180G to detect whether the mobile phone 100 is in a pocket, to avoid an accidental touch. The fingerprint sensor 180H is configured to collect a fingerprint. The mobile phone 100 may use a feature of the collected fingerprint to implement fingerprint-based unlocking, application access locking, fingerprint-based image shooting, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor located near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid abnormal shutdown caused by the low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. The display 194 may provide a visual output related to the touch operation. In some other embodiments, the touch sensor 180K may alternatively be disposed on a surface of the mobile phone 100 at a location different from a location of the display 194.

For example, the touch sensor 180K may detect a touch operation of the user on the display, for example, may detect a touch and hold operation performed by the user on an application icon. Then, the mobile phone 100 may respond to the touch and hold operation and display an operation menu (for example, the operation menu may include uninstallation, compression, and the like). Then, the user may select the compression from the operation menu. The mobile phone 100 may respond to the user operation and display a compression manner (for example, light compression, medium compression, or heavy compression). In this case, the user may tap to select a compression manner. The mobile phone 100 may respond to the user operation and perform compression, for example, transparent compression, on an application.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The mobile phone 100 may receive a button input, and generate a button signal input related to a user setting and function control of the mobile phone 100. The motor 191 may generate a vibration prompt. The motor 191 may be configured to provide an incoming call vibration prompt and a touch vibration feedback. For example, touch operations performed on different applications (for example, image shooting and audio playing) may correspond to different vibration feedback effects. The indicator 192 may be an indicator light, and may be configured to indicate a charging status and a state of charge change, or may be configured to indicate a message, a missed call, a notification, and the like. The SIM card interface 195 is used to connect to a SIM card. The SIM card may be inserted into the SIM card interface 195 or removed from the SIM card interface 195, to implement contact with and separation from the mobile phone 100.

It may be understood that the components shown in FIG. 1 do not constitute a limitation on a mobile phone. The mobile phone may further include more or fewer components than those shown in the figure, or some components may be combined, or some components may be split, or different component arrangements may be used. In the following embodiments, the mobile phone 100 shown in FIG. 1 is used as an example for description.

A software system of the mobile phone 100 may use a layered architecture, including an event-driven architecture, a microkernel architecture, a microservice architecture, or a cloud architecture. In embodiments, an ANDROID system with a layered architecture is used as an example to describe a software structure of the mobile phone 100. It should be understood that the system in embodiments may alternatively be a HarmonyOS system. This is not limited in this application.

Figure 2:
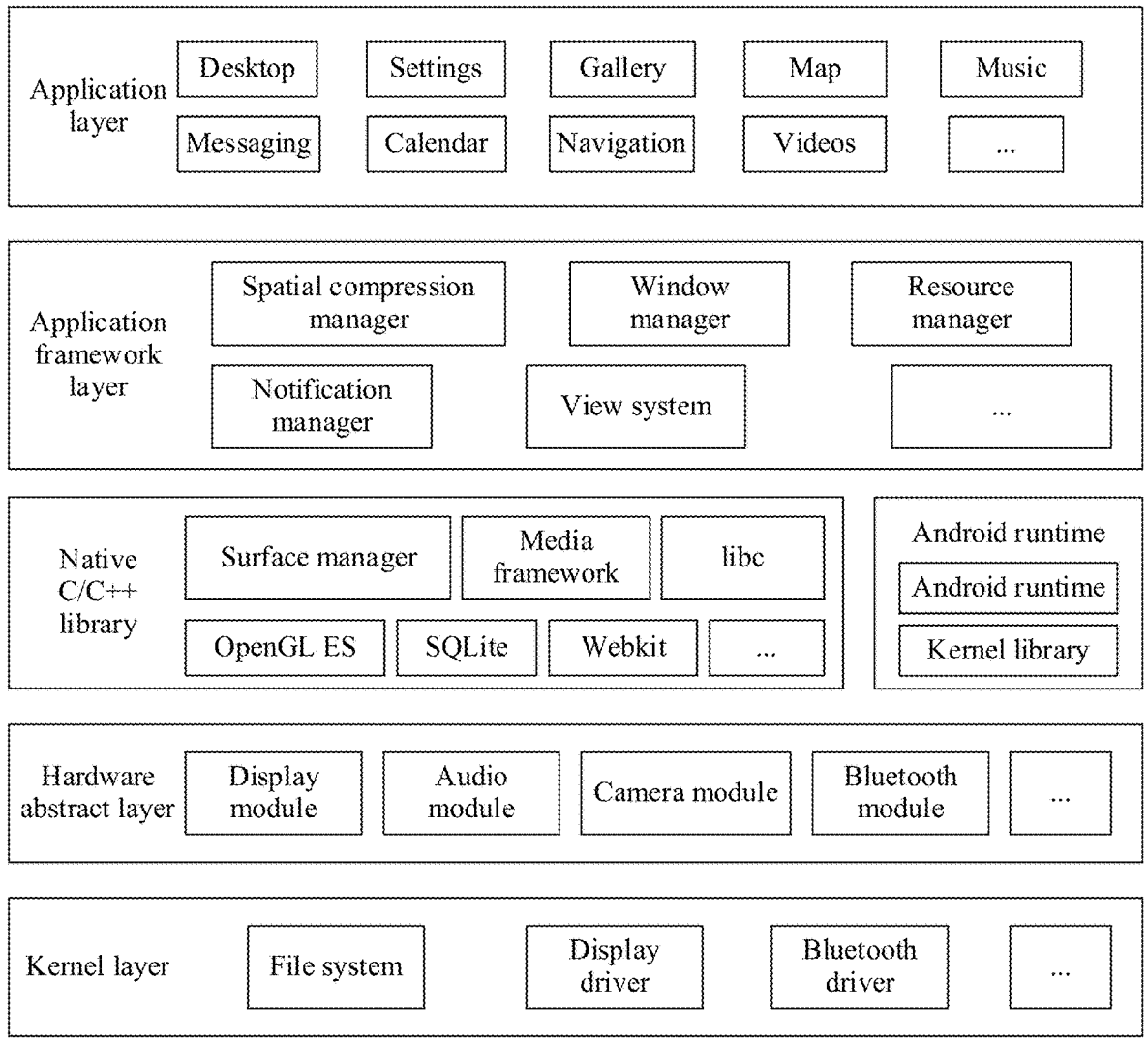
FIG. 2 is a block diagram of a software structure of an electronic device according to an embodiment.

The following describes a software structure of an electronic device with reference to different scenarios. FIG. 2 is a block diagram of the software structure of the mobile phone 100 according to an embodiment. In the layered architecture, software is divided into several layers, and each layer has a clear role and task. The layers communicate with each other through a software interface. In some embodiments, an ANDROID system is divided into five layers: an application layer, an application framework layer, an ANDROID runtime (ART) and native C/C++ library, a hardware abstract layer (HAL), and a kernel layer from top to bottom.

The application layer may include a series of application packages. As shown in FIG. 2, the application packages may include applications such as Desktop, Settings, Gallery, Calendar, Phone, Map, Navigation, Music, Videos, and Messaging.

The application framework layer provides an application programming interface (API) and a programming framework for an application at the application layer. The application framework layer includes some predefined functions.

As shown in FIG. 2, the application framework layer may include a spatial compression manager, a window manager, a content provider, a view system, a resource manager, a notification manager, an activity manager, an input manager, and the like.

The spatial compression manager is configured to: after a user selects a to-be-compressed application, scan application files, and select a to-be-compressed file and a file compression algorithm from the application files. For example, the user selects to perform light compression on the Gallery application, and then the spatial compression manager may scan application files of the Gallery, select a to-be-compressed file from the application files of the Gallery, divide the file into file blocks, determine a size of the file blocks, and select a compression algorithm.

The window manager provides a window manager service (WMS). The WMS may be used for window management, window animation management, surface management, and as a transit station of an input system.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to establish an application. A display interface may include one or more views. For example, a display interface including an SMS message notification icon may include a view for displaying a text and a view for displaying a picture.

The resource manager provides various resources such as a localized character string, an icon, a picture, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or an indicator light blinks.

The activity manager may provide an Activity Manager Service (AMS). The AMS may be used to start, switch, and schedule system components (for example, activities, services, content providers, and broadcast receivers), and manage and schedule application processes.

The input manager may provide an Input Manager Service (IMS). The IMS may be used to manage a system input, for example, a touchscreen input, a button input, and a sensor input. The IMS obtains an event from an input device node and allocates the event to an appropriate window through interaction with the WMS.

The ANDROID runtime includes a core library and ANDROID runtime. The ANDROID runtime is responsible for converting source code into machine code. The ANDROID runtime mainly includes an ahead of time (AOT) compilation technology and a just in time (JIT) compilation technology.

The core library is mainly used to provide functions of basic Java libraries, such as a basic data structure library, a mathematics library, an I/O library, a tool library, a database, and a network library. The core library provides an API for the user to develop an ANDROID application.

The native C/C++ library may include a plurality of function modules, such as a surface manager a media framework, libc, OpenGL ES, SQLite, and Webkit.

The surface manager is configured to manage a display subsystem, and provide fusion of 2D and 3D layers for a plurality of applications. The media framework supports playback and recording in a plurality of commonly used audio and video formats, static image files, and the like. The media library may support a plurality of audio and video coding formats such as MPEG-4, H.264, MP3, AAC, AMR, JPG, and PNG. The OpenGL ES draws and operates 2D and 3D graphics in an application. The SQLite provides a lightweight relational database for the application of the electronic device 100.

The hardware abstract layer runs in user space, encapsulates a kernel layer driver, and provides an interface for an upper layer to invoke.

The kernel layer is a layer between hardware and software. The kernel layer includes at least a file system, a display driver, a Bluetooth driver, a camera driver, an audio driver, and a sensor driver. The file system can provide a file compression capability.

In some embodiments, the user may select, on the desktop, a to-be-compressed application (for example, the Gallery application) and a compression manner, and tap a compression button. Then, the spatial compression manager may scan application files, and select a to-be-compressed file from the application files and a file compression algorithm. Then, the spatial compression manager may invoke the file system to compress the Gallery application. In some other embodiments, a system application, for example, the Settings application, is used to invoke the file system to compress the Gallery application.

The following embodiment uses an architecture of the mobile phone 100 shown in FIG. 1 as an example for description.

In embodiments, an application compression process may be triggered by a user, or may be triggered by an electronic device. This is not limited in this disclosure. The following uses the mobile phone 100 as an example to describe an application compression method triggered by the user.

Figure 3:
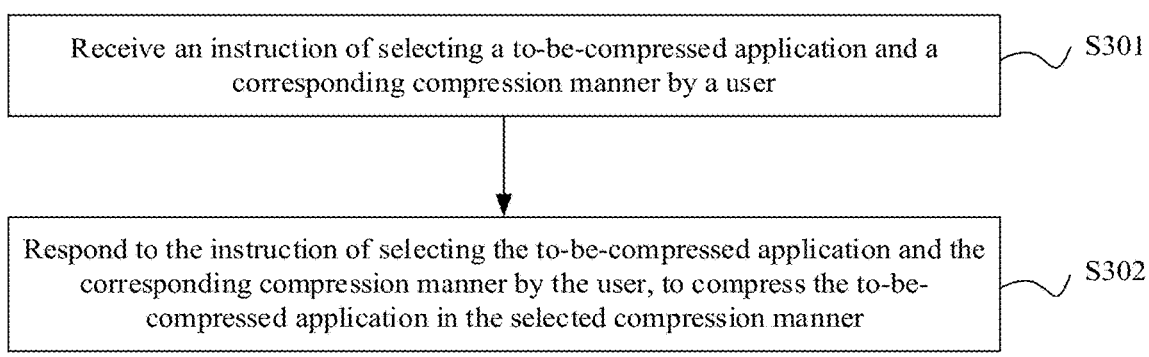
FIG. 3 is a schematic flowchart of an application compression method according to an embodiment.

FIG. 3 is a flowchart of an application compression method according to an embodiment. As shown in FIG. 3, the method may include the following steps.

S301: Receive an instruction of selecting a to-be-compressed application and a corresponding compression manner by a user.

In some examples, the user may select the to-be-compressed application and the compression manner corresponding to the application in the following several manners.

Manner 1: The user triggers, by using a gesture operation on a home screen, an application to enter an editing mode, and then selects the to-be-compressed application and the corresponding compression manner.

Figure 4A:
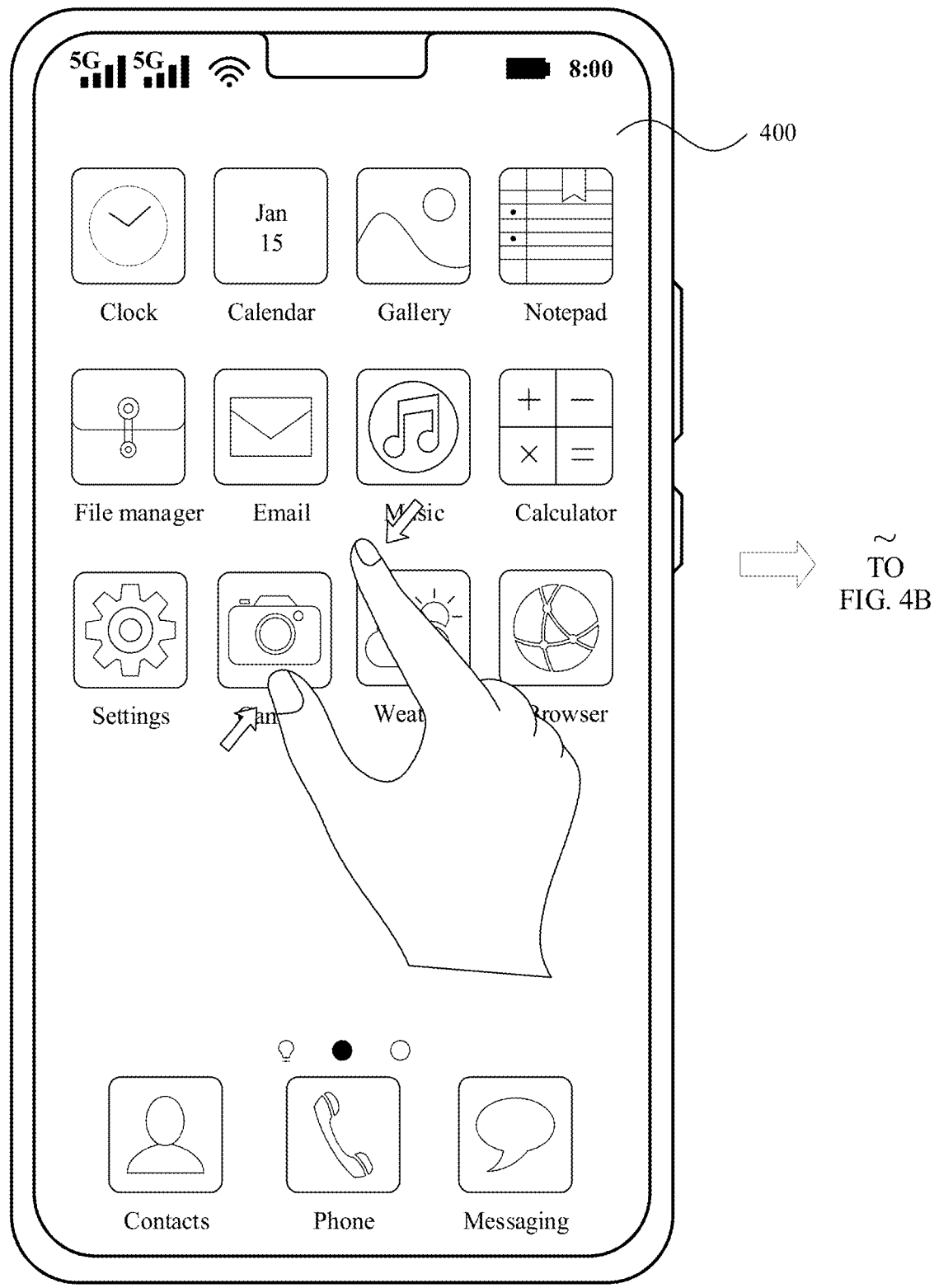
FIG. 4A to FIG. 4C are a diagram of a user interface for compressing an application according to an embodiment.
Figure 4B:
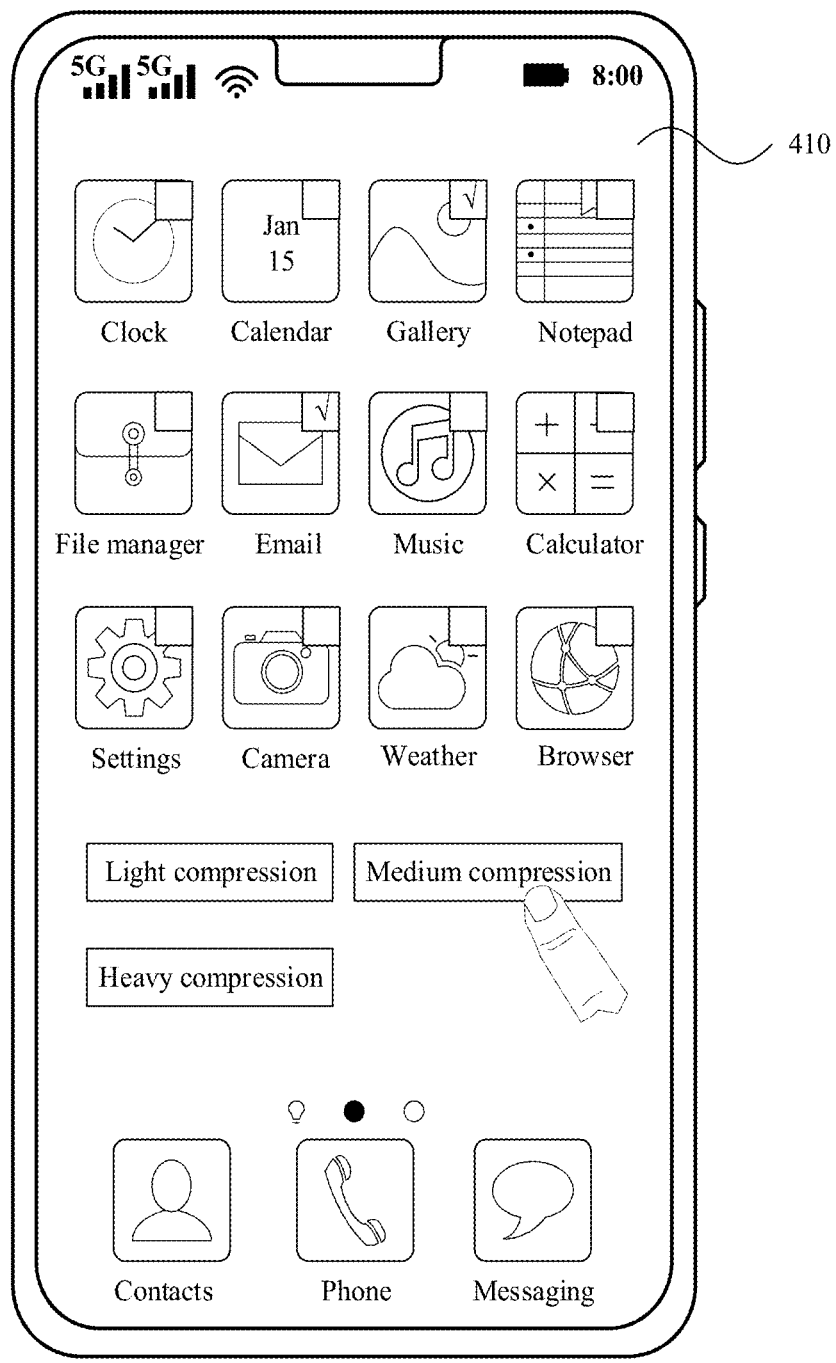
Figure 4C:
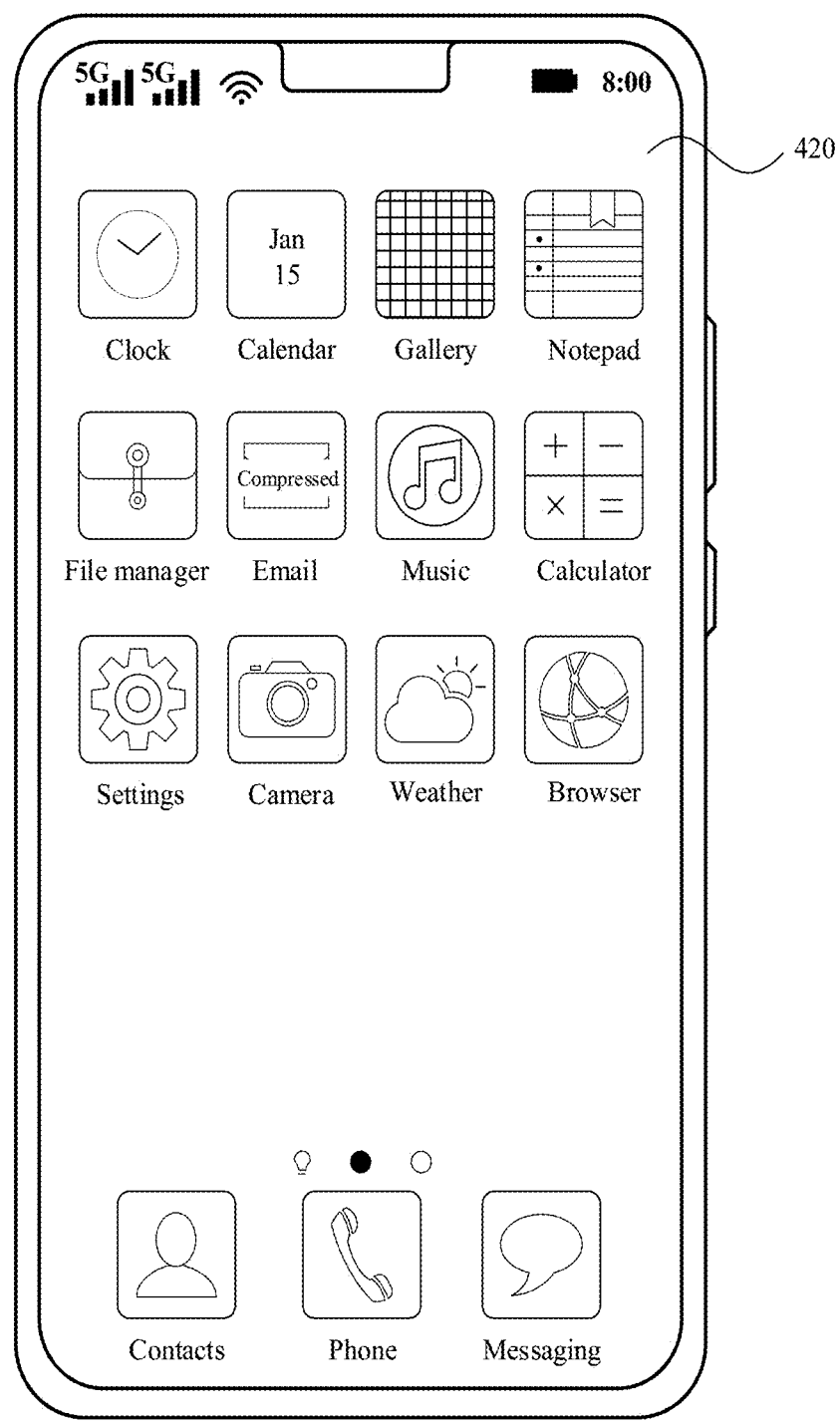

Example 1: As shown in FIG. 4A to FIG. 4C, it is assumed that the mobile phone 100 displays a home screen 400 shown in FIG. 4A. When detecting a gesture operation of the user on the home screen, for example, a gesture operation of pinching two fingers shown in the figure, the mobile phone 100 may respond to the gesture operation of the user, to display an interface 410, for example, shown in FIG. 4B. The interface 410 includes identifiers (for example, Map or Gallery) of a plurality of applications with selection boxes, and identifiers of compression manners (for example, light compression, medium compression, and heavy compression). Then, the mobile phone 100 may detect an operation performed by the user on a selection box of an application. For example, the user selects, on the interface 410 shown in FIG. 4B, an application icon corresponding to the Gallery application and an application icon corresponding to an Email application, where selection marks (for example, check marks v) may be displayed in the selection boxes of the Gallery application and the Email application; and then taps a medium compression manner button. The mobile phone 100 may respond to the operation and perform medium compression on the Gallery application and the Email application. For an interface after compression, refer to an interface 420 shown in FIG. 4C. Application icons after compression and application icons before compression may be displayed on the interface 420. For a same application, an application icon before compression and an application icon after compression may be different. For example, for a same application, transparency of application icons before and after compression may be different. The user can distinguish, by changing transparency of the application, whether the application is compressed.

It should be understood that a same or different compression manners may be selected for different applications. For example, first, the user may select the application icon of the Gallery application, and then tap a medium compression manner button to compress the Gallery application. Then, the user may select the application icon of the Email application, and then tap a light compression manner button to compress the Email application.

In some examples, if a plurality of applications are selected for compression, application icons after compression may be the same or may be different for the different applications. For example, the Gallery application and the Email application are selected for compression. For example, an application icon of the compressed Gallery application may be shown in FIG. 4C, and a word "compressed" may be displayed on the application icon of the compressed Email application. This is not limited in this application.

In some examples, when different compression manners are selected for a same application/different applications, display styles of application icons after compression may be different. For example, transparency corresponding to different compression manners may be different. The user can distinguish a compression manner of an application based on transparency of the application.

Figure 5:
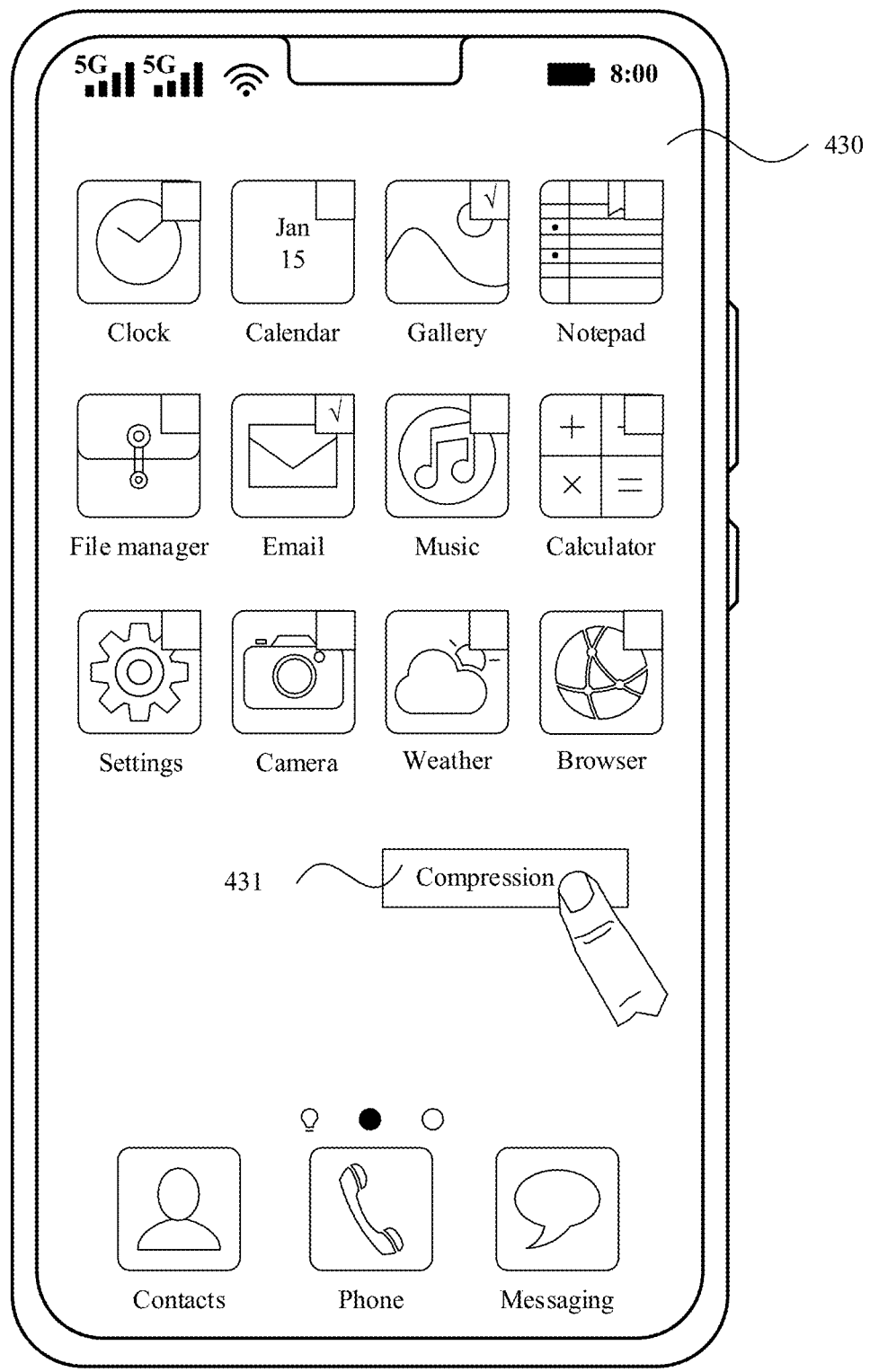
FIG. 5 is a diagram of another user interface for compressing an application according to an embodiment.

As shown in FIG. 5, in some other embodiments, when detecting a gesture operation of the user on the home screen, for example, a gesture operation of pinching two fingers shown in the figure, the mobile phone 100 may respond to the gesture operation of the user and display an interface 430. The interface 430 may include identifiers (for example, Map and Gallery) of a plurality of applications with selection boxes, and a compression button 431. For example, the three compression manners in the diagram shown in FIG. 4B may not be displayed on the interface. Then, the user may select the Gallery application and the Email application on the interface 430, and tap the compression button 431. The mobile phone 100 may respond to the operation, and compress the Gallery application and the Email application. For an interface after compression, refer to the interface 420 shown in FIG. 4C.

In a possible implementation, the mobile phone 100 may automatically select a corresponding compression algorithm for an application based on a usage status of the application, for example, a quantity of times of using the application. For example, the mobile phone 100 may classify applications based on a quantity of days in which the applications are not used, and then select different compression algorithms for different levels. For example, an lz4 algorithm is used for an application that has not been used for more than 7 days, a Zstd algorithm is used for an application that has not been used for more than 14 days, and a zip algorithm is used for an application that has not been used for more than 30 days. A corresponding compression algorithm may be automatically selected for the application in another manner. For example, a compression algorithm is selected based on a use frequency of a file of the application. This is not limited in this disclosure.

It should be noted that the gesture operation shown in FIG. 4A to FIG. 4C and FIG. 5 is merely an example. In embodiments, the gesture operation may be another operation, for example, an operation of drawing a circle or drawing a polygon on a display. Alternatively, the gesture operation may be an operation like "Shake". This is not limited in embodiments.

It should be understood that the to-be-compressed application selected by the user may include one or more applications. For example, the user may select a plurality of application icons on the interface 410, and then compress a plurality of applications.

The following separately describes in detail the three compression manners in embodiments.

1. Light Compression Manner

Figure 6A:
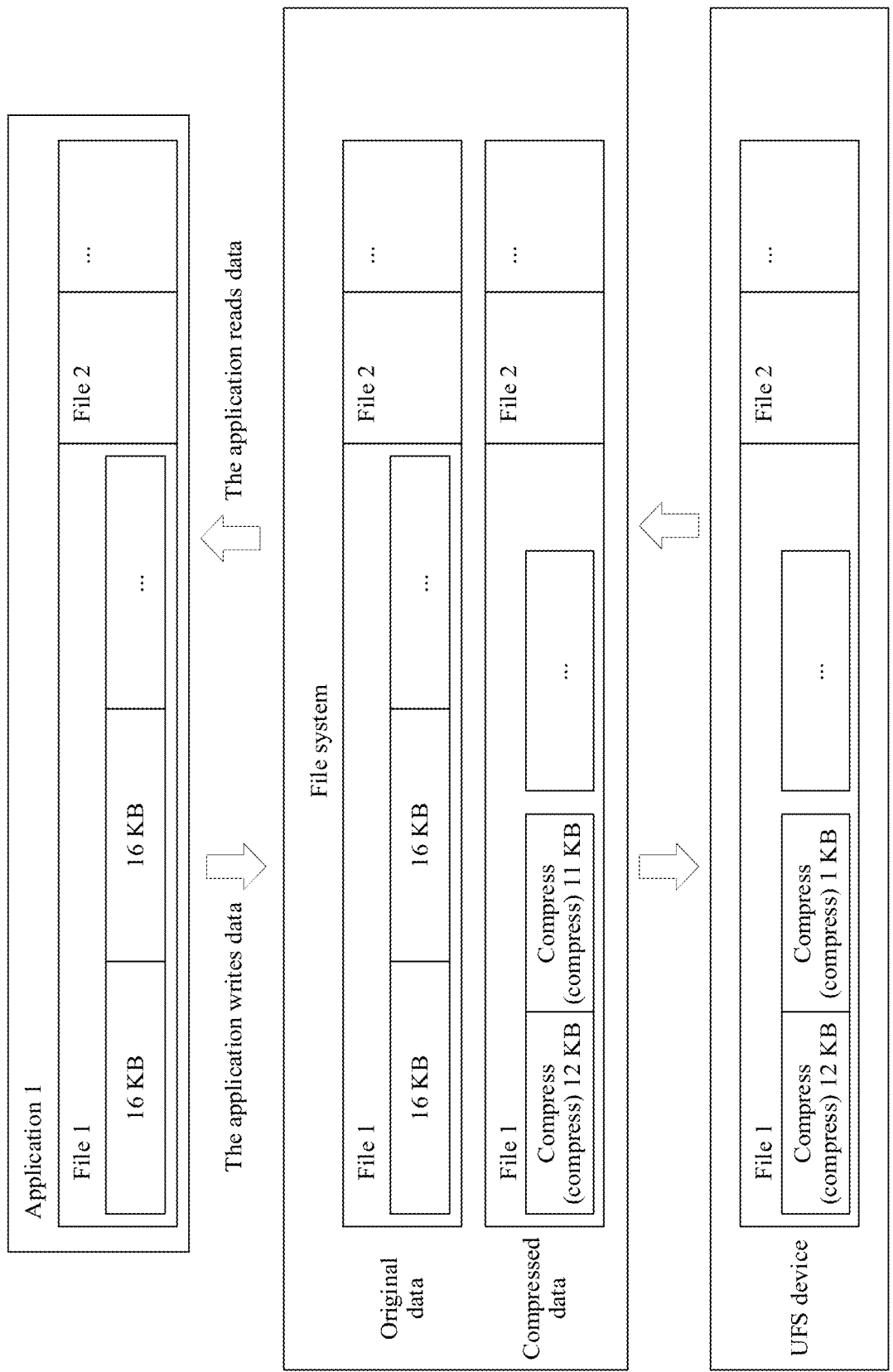
FIG. 6A is a diagram of a light compression manner of a file according to an embodiment.

In this compression manner, files of an application may be divided into a plurality of files, and then each file is divided into file blocks, and finally compressed based on the file blocks. For example, as shown in FIG. 6A, it is assumed that an application 1 includes a plurality of files. For example, a file 1 may be divided into a plurality of file blocks of 16 KB, then application data is written into a file system, and the file system compresses the file blocks. For example, 12 KB compressed data, 11 KB compressed data, or the like may be obtained. Finally, the compressed data is written to a UFS device. A file size is significantly reduced compared with a file size of the file before compression.

Correspondingly, during decompression, the data may be read from the UFS device, and then decompressed in the file system, and finally the decompressed data is provided for the application.

It should be understood that a file size shown in the figure is merely an example. A spatial compression manager may determine sizes of file blocks obtained through division based on an actual situation of the application file. For example, original data shown in the figure may alternatively be 32 KB. This is not limited in this disclosure.

In some examples, the file of the application may include a file name, an index node (inode), and a data part. The inode may include a quantity of bytes of the file, a creation date of the file, a user identifier (User ID) of a file owner, and the like. For example, the following two manners may be used to perform transparent compression on an application.

In a first manner, only a data part is compressed. For example, it is assumed that a file of the application is a file 1.txt, and data content in the file 1.txt is 1, 2, 3, 4, 5, 6, 7, 8, and 9. In this case, 1, 2, 3, 4, 5, 6, 7, 8, and 9 may be compressed. For example, compressed content is 1 to 9, that is, a compressed file is a file 1.txt. In this case, data content in the file 1.txt is 1 to 9.

In a second manner, a file of the application is replaced. For example, it is assumed that the file of the application is a file 1.txt, and data content in the file 1.txt is 1, 2, 3, 4, 5, 6, 7, 8, and 9, the file 1 may be compressed. For example, the data content 1, 2, 3, 4, 5, 6, 7, 8, and 9 is compressed into 1 to 9. In this case, the file 1.txt whose data content is 1, 2, 3, 4, 5, 6, 7, 8, and 9 may be replaced with a file 1.txt whose data content is 1 to 9. In this compression manner, an ID in an inode may be changed. For example, an ID before compression is 1, and an ID after compression is 2.

In the foregoing two manners, for the application, neither a name nor an extension of the application file changes, but a storage form of the stored data content changes. Therefore, the compression process is not perceptible to the application. In addition, in embodiments, when the application is compressed, a source file of the application does not need to be deleted, that is, the application does not need to be deleted. In this way, the application does not need to be reinstalled during subsequent use, so that storage space can be saved, and user experience can be improved.

2. Medium Compression Manner

In the compression manner, all files of an application may be separately compressed into compressed files.

Figure 6B:
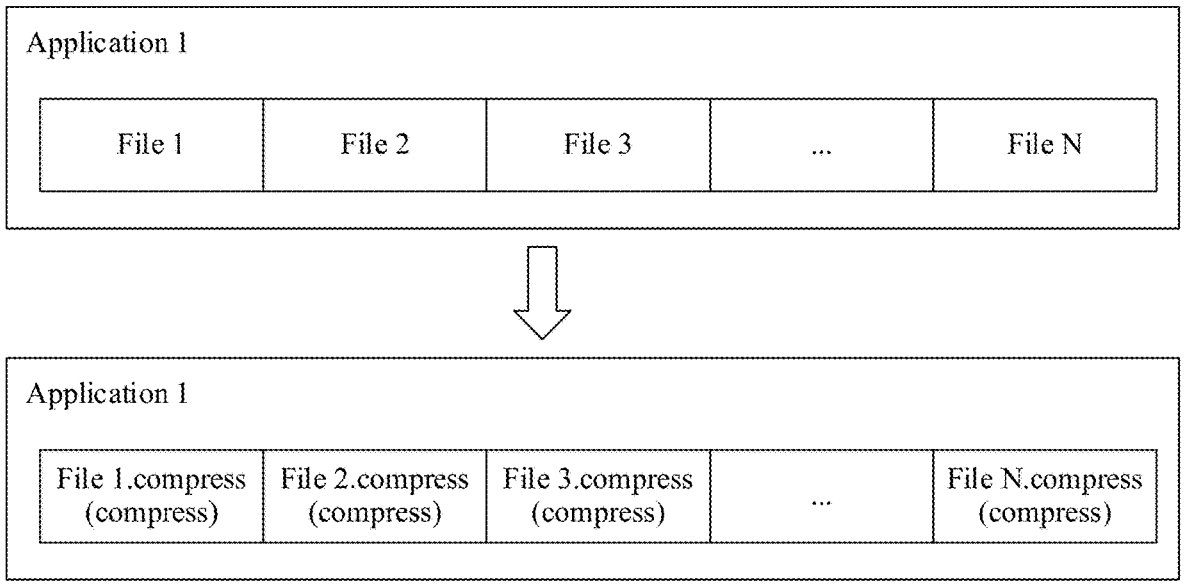
FIG. 6B is a diagram of a medium compression manner of a file according to an embodiment.

For example, as shown in FIG. 6B, it is assumed that an application 1 includes N files, for example, a file 1, a file 2, a file 3, ..., and a file N. Then, the file 1 may be compressed into a compressed file 1, for example, denoted as a file 1.compress, and the file 2 may be compressed into a compressed file 2, for example, denoted as a file 2.compress. By analogy, a plurality of files are compressed separately.

3. Heavy Compression Manner

Figure 6C:
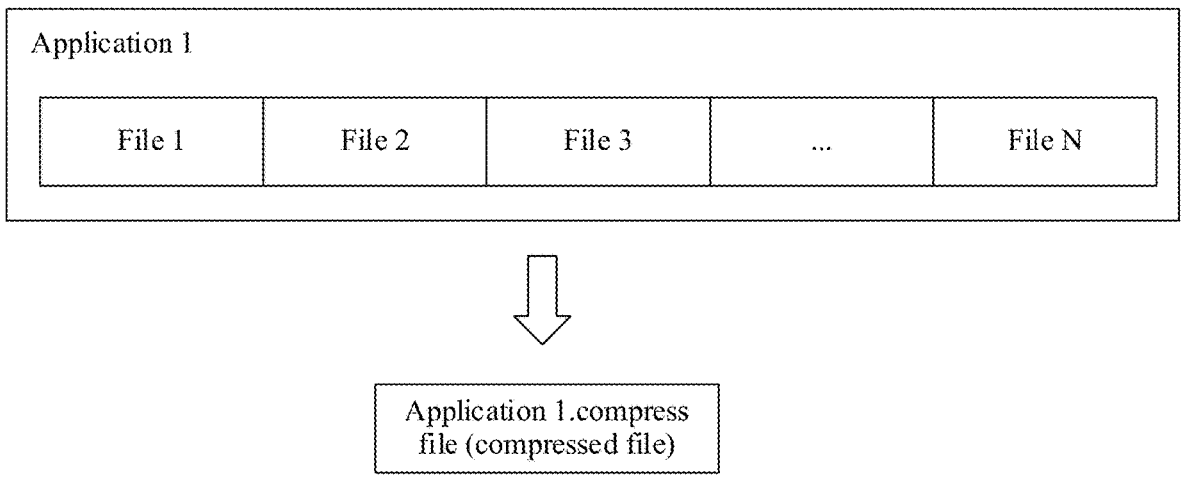
FIG. 6C is a diagram of a heavy compression manner of a file according to an embodiment.

In the compression manner, all files of an application may be packaged into one file for compression, that is, compressed into one compressed file. For example, as shown in FIG. 6C, it is assumed that an application 1 includes N files, for example, a file 1, a file 2, a file 3, ..., and a file N. Then, the file 1 to the file N may be packaged into one file for compression. For example, a file obtained through compression is an application 1.compress file.

Example 2: As shown in FIG. 7A to FIG. 7D, it is assumed that the mobile phone 100 displays a home screen 600 shown in FIG. 7A. The user may touch and hold an application icon on the home screen 600, for example, may touch and hold a Gallery application icon. The mobile phone 100 may respond to the touch and hold operation of the user, for example, display an interface 610 shown in FIG. 7B. The interface 610 may include a sharing button 611, an uninstallation button 612, and a compression button 613. Then, the user may tap the compression button 613. The mobile phone 100 may respond to the tapping operation and display an interface 620 shown in FIG. 7C. The interface 620 may include a light compression button 621, a medium compression button 622, and a heavy compression button 623. Then, the user may select a compression manner on the interface 620, for example, tap the medium compression button 622. The mobile phone 100 may respond to the operation and perform medium compression on a Gallery application. For an interface after compression, refer to an interface 630 shown in FIG. 7D. The interface 630 may include an application icon after compression and an application icon before compression. A word "compressed" may be displayed under a name of the application icon after compression. The word may be alternatively displayed at another location. This is not limited in this disclosure. In other words, the user may be notified, based on text prompt information, whether the application is compressed.

Figure 7A:
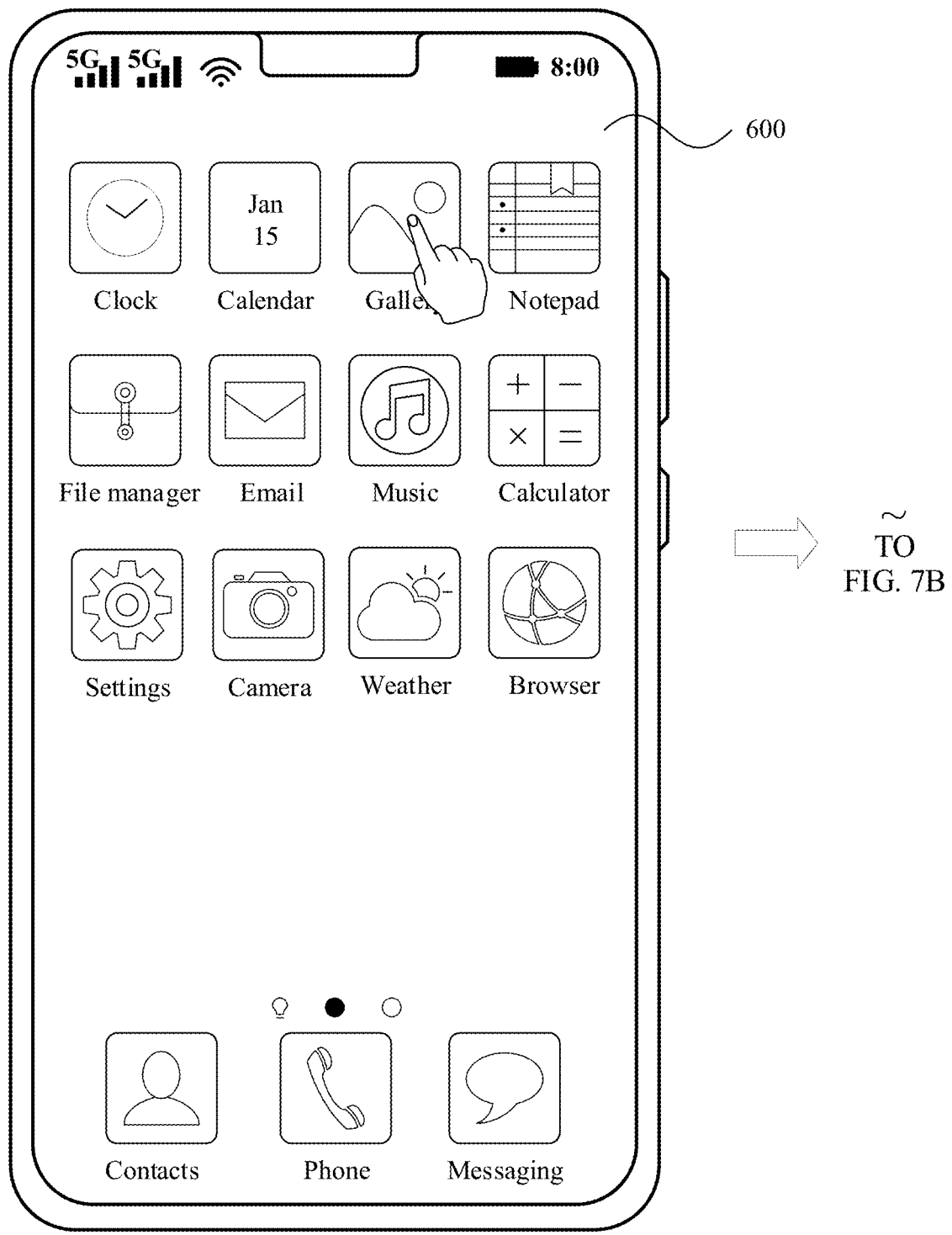
FIG. 7A to FIG. 7D are a diagram of another user interface for compressing an application according to an embodiment.
Figure 7B:
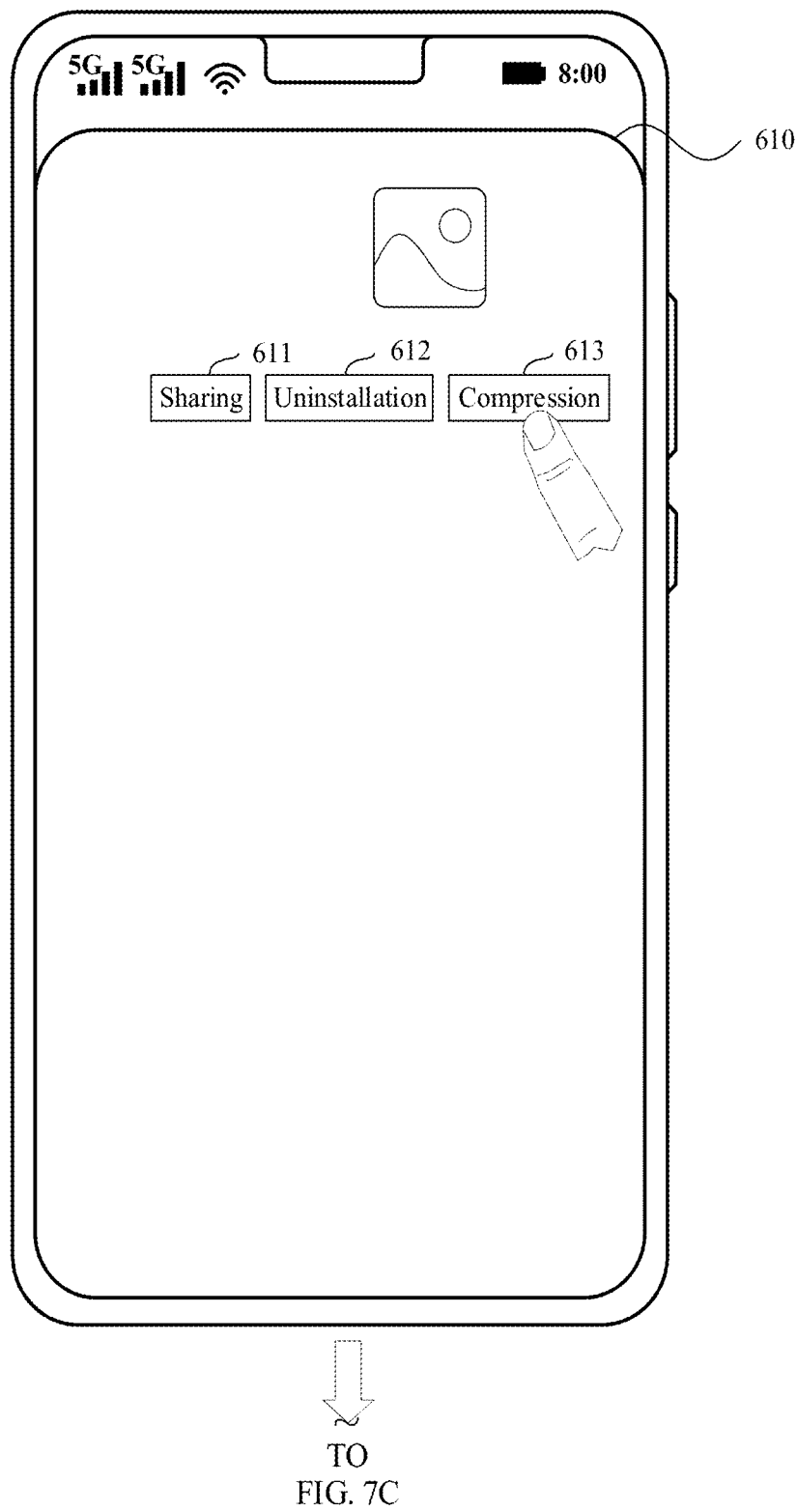
Figure 7C:
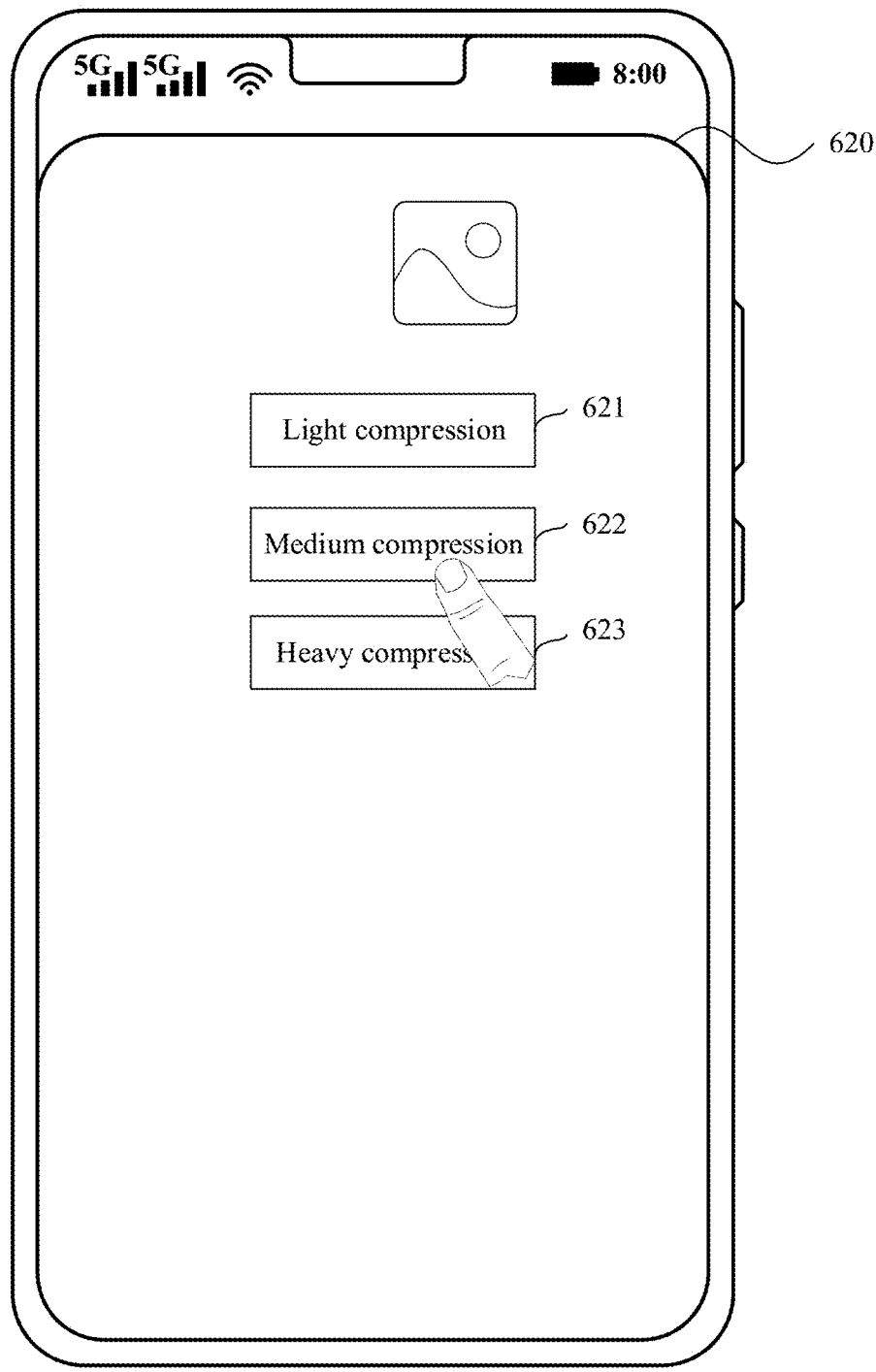
Figure 7D:
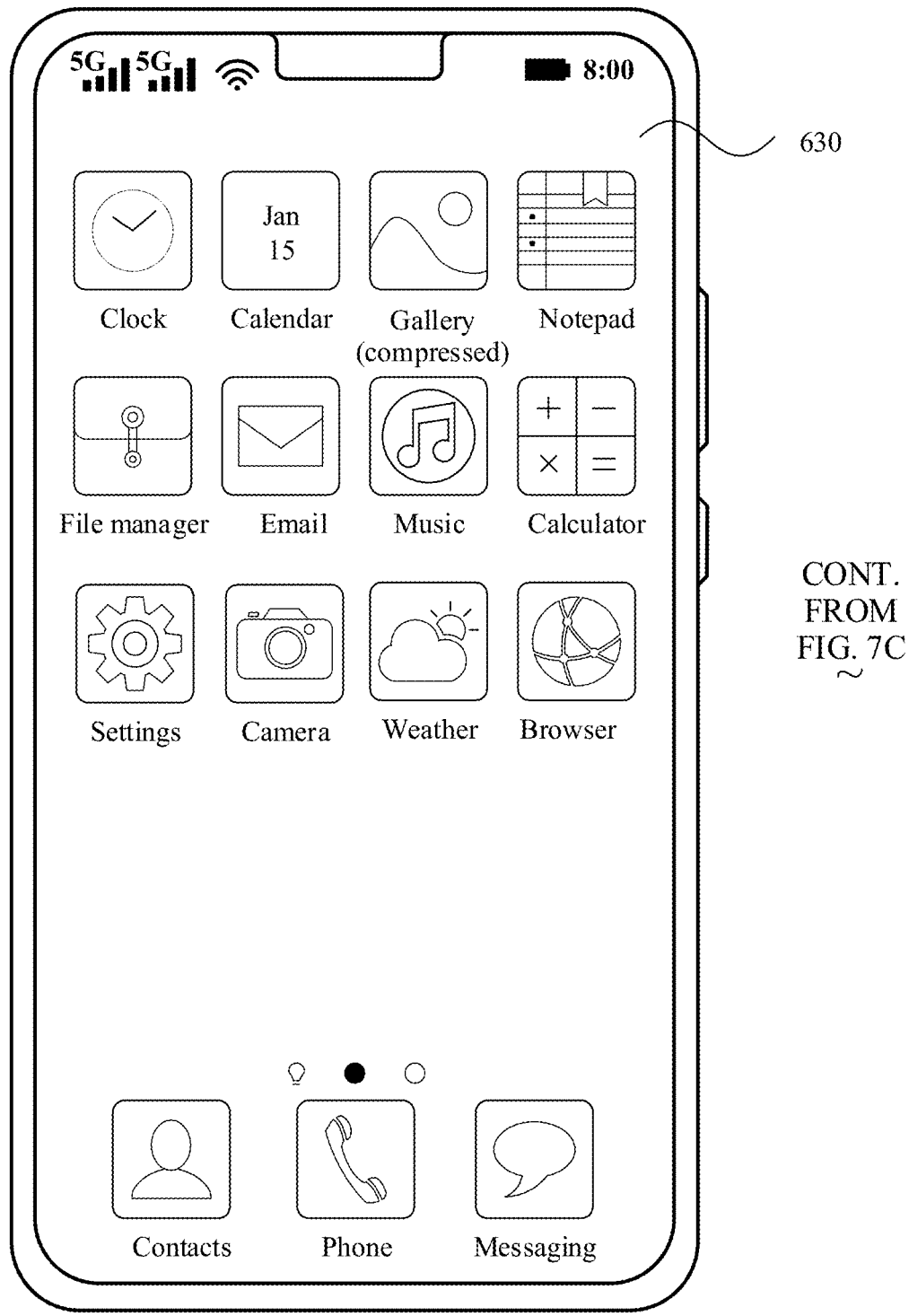

It should be noted that, during actual product implementation, the user may tap the compression button 613, and the mobile phone 100 may respond to the tapping operation and automatically select a compression algorithm to compress the Gallery application, that is, directly display the interface 630 shown in FIG. 7D, without the need for the user to select a compression manner.

It should be understood that, the touch and hold operation may be that the mobile phone 100 displays the interface 610 shown in FIG. 7B only after a location of an application icon is touched and held for preset duration (for example, 2 seconds).

Manner 2: The user may select a to-be-compressed application and a corresponding compression manner in system settings.

Figure 8A:
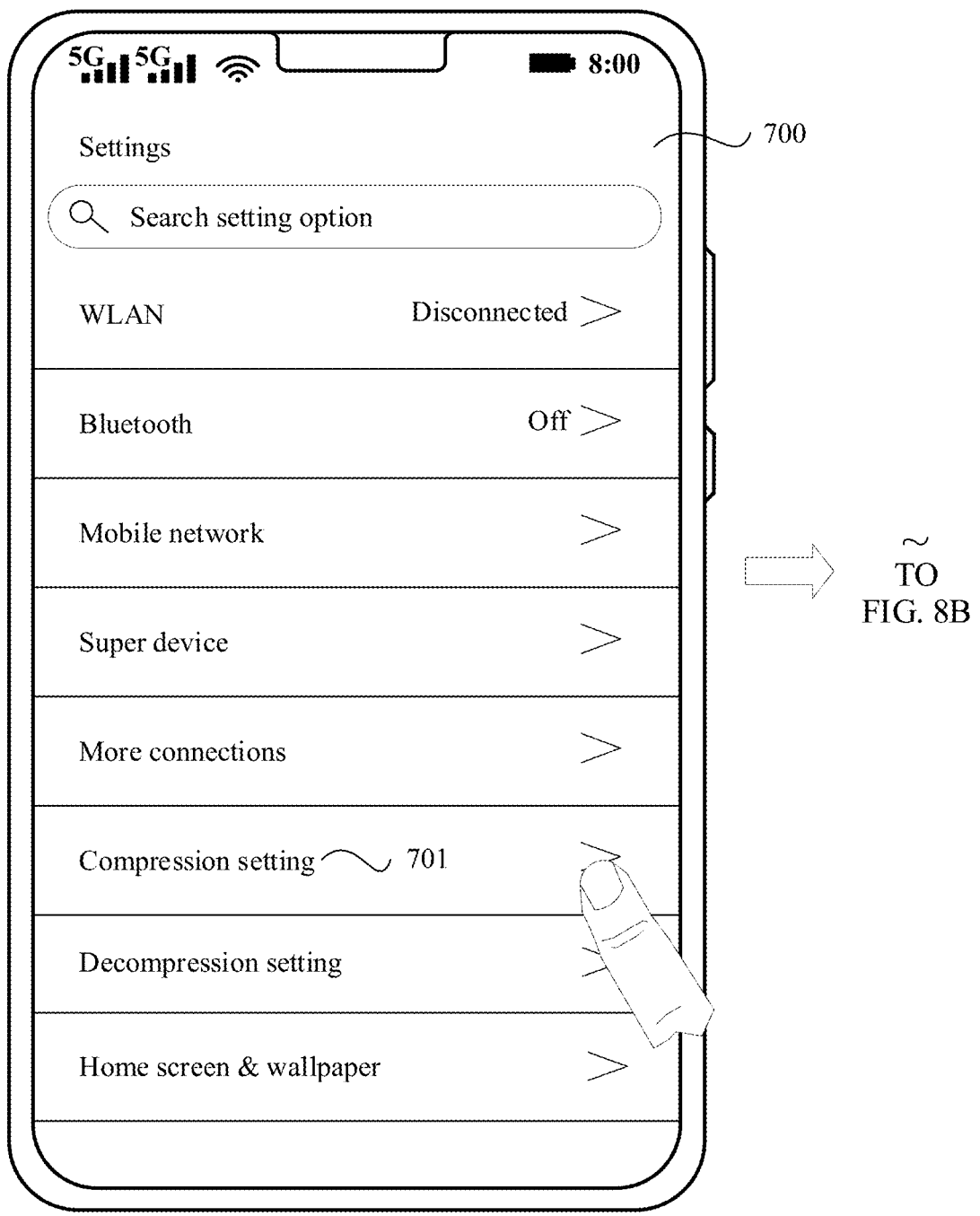
FIG. 8A to FIG. 8C are a diagram of another user interface for compressing an application according to an embodiment.
Figure 8B:
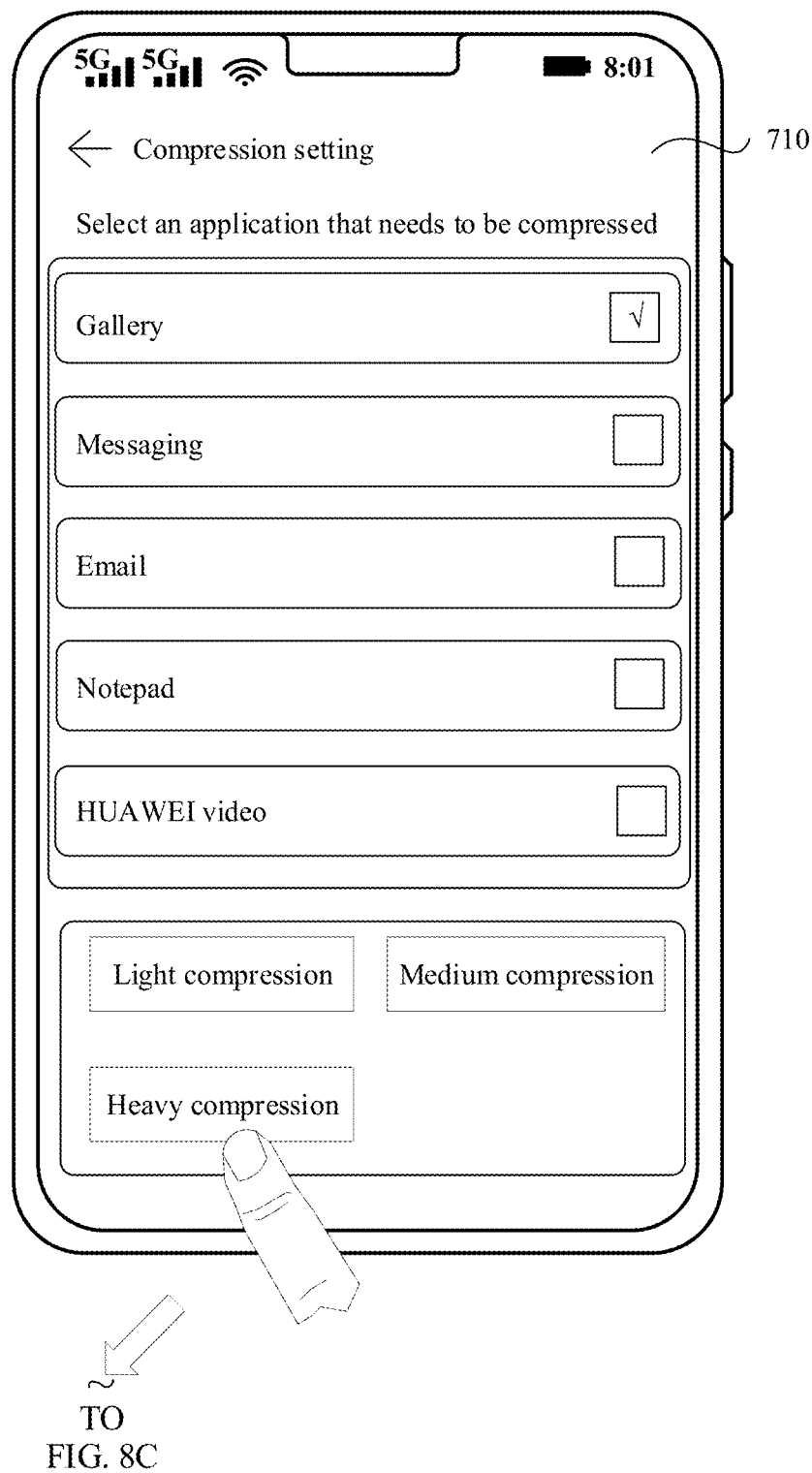
Figure 8C:
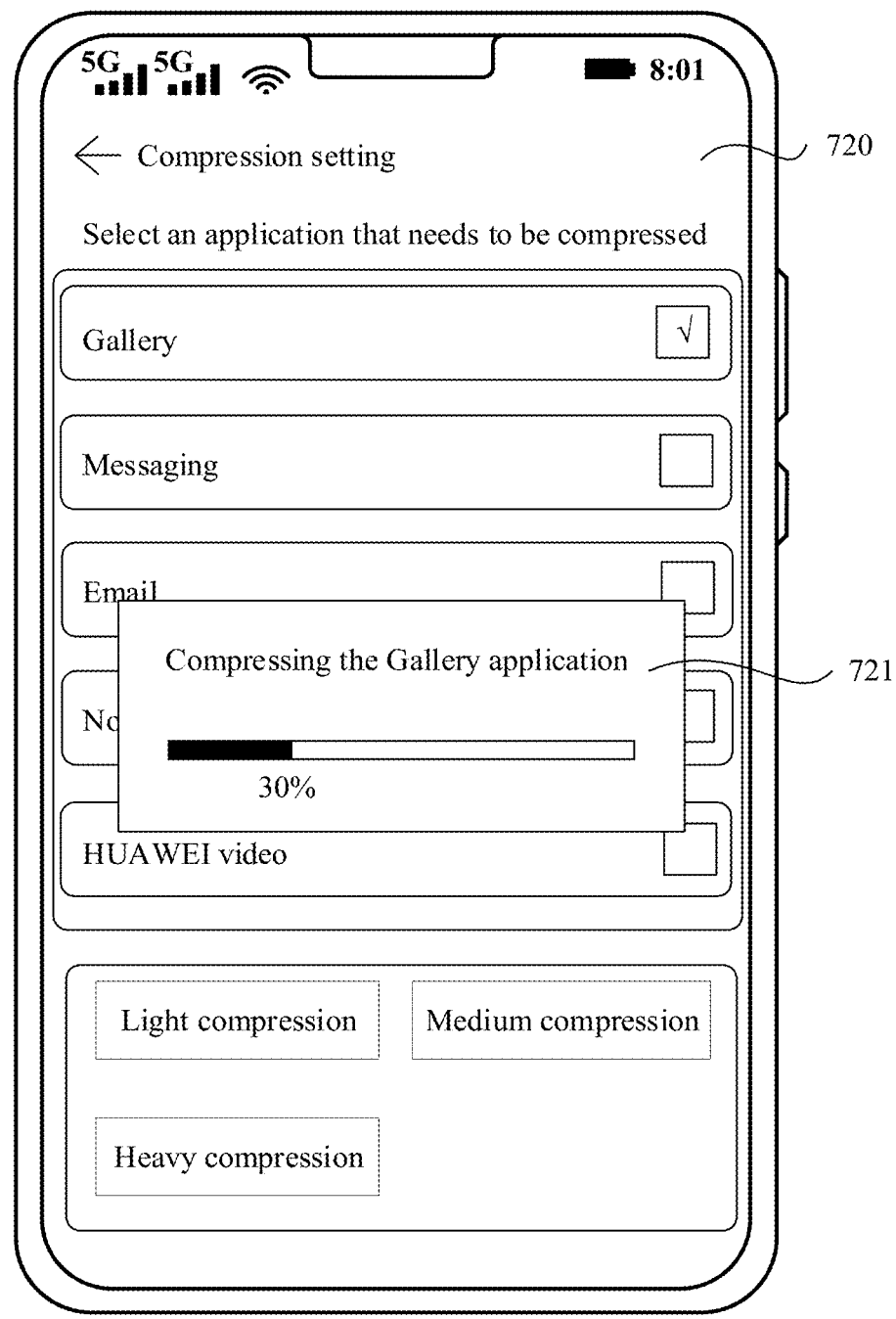

Example 1: As shown in FIG. 8A to FIG. 8C, it is assumed that the user taps a Settings application icon on a home screen of the mobile phone 100. The mobile phone 100 may respond to the tapping operation and enter a Settings application interface. For example, refer to an interface 700 shown in FIG. 8A. The interface 700 may include a compression setting option 701. Then, the user may tap the compression setting option 701 to enter a compression setting interface. For example, an interface 710 shown in FIG. 8B may be displayed. The user may select, on the interface 710, a to-be-compressed application and a compression manner. For example, after selecting Gallery, the user may continue to select heavy compression in the compression manner. After the user taps the heavy compression, the mobile phone 100 may compress the Gallery application. In this case, an interface 720 shown in FIG. 8C may be displayed on a display. The interface 720 may include prompt information 721. For example, the prompt information 721 may be "Compressing the Gallery application" and compression progress, for example, "30%" shown in the figure. The user may view the compression progress based on the prompt information. After the compression is completed, the mobile phone may continue to display the interface 710 shown in FIG. 8B.

It should be understood that the user may alternatively select a plurality of applications on the interface 710 shown in FIG. 8B for compression. A same or different compression manners may be selected for different applications.

Figure 9A:
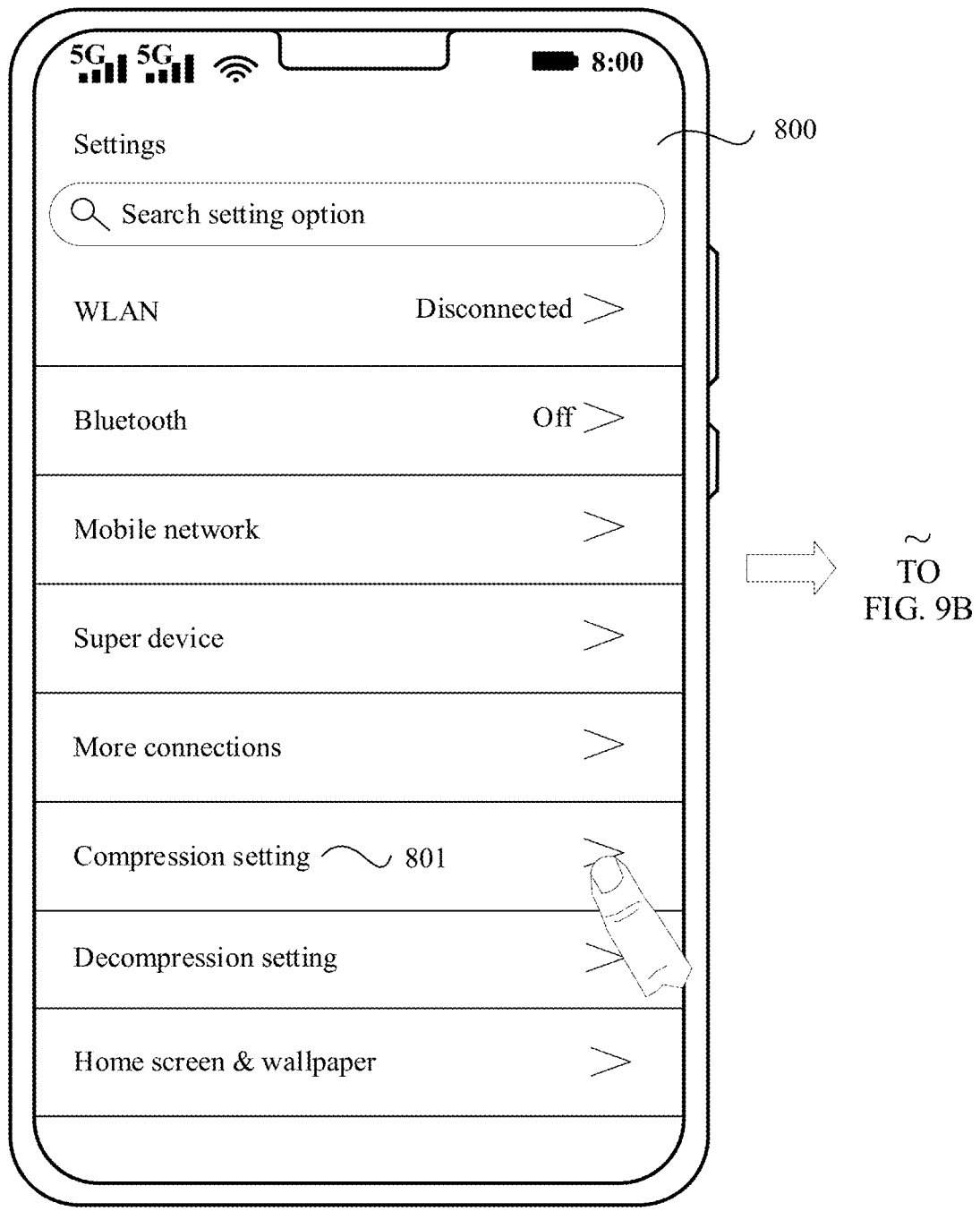
FIG. 9A to FIG. 9C are a diagram of another user interface for compressing an application according to an embodiment.
Figure 9B:
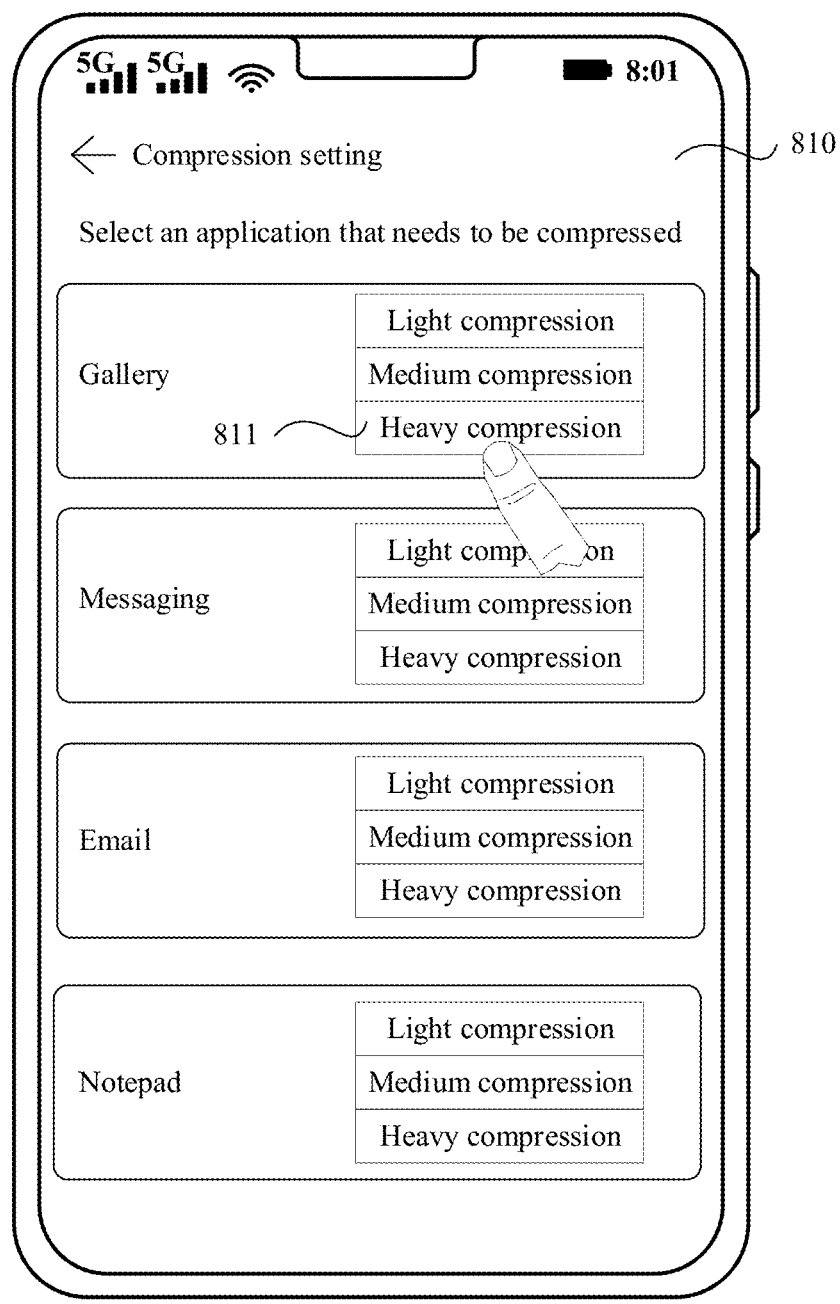
Figure 9C:
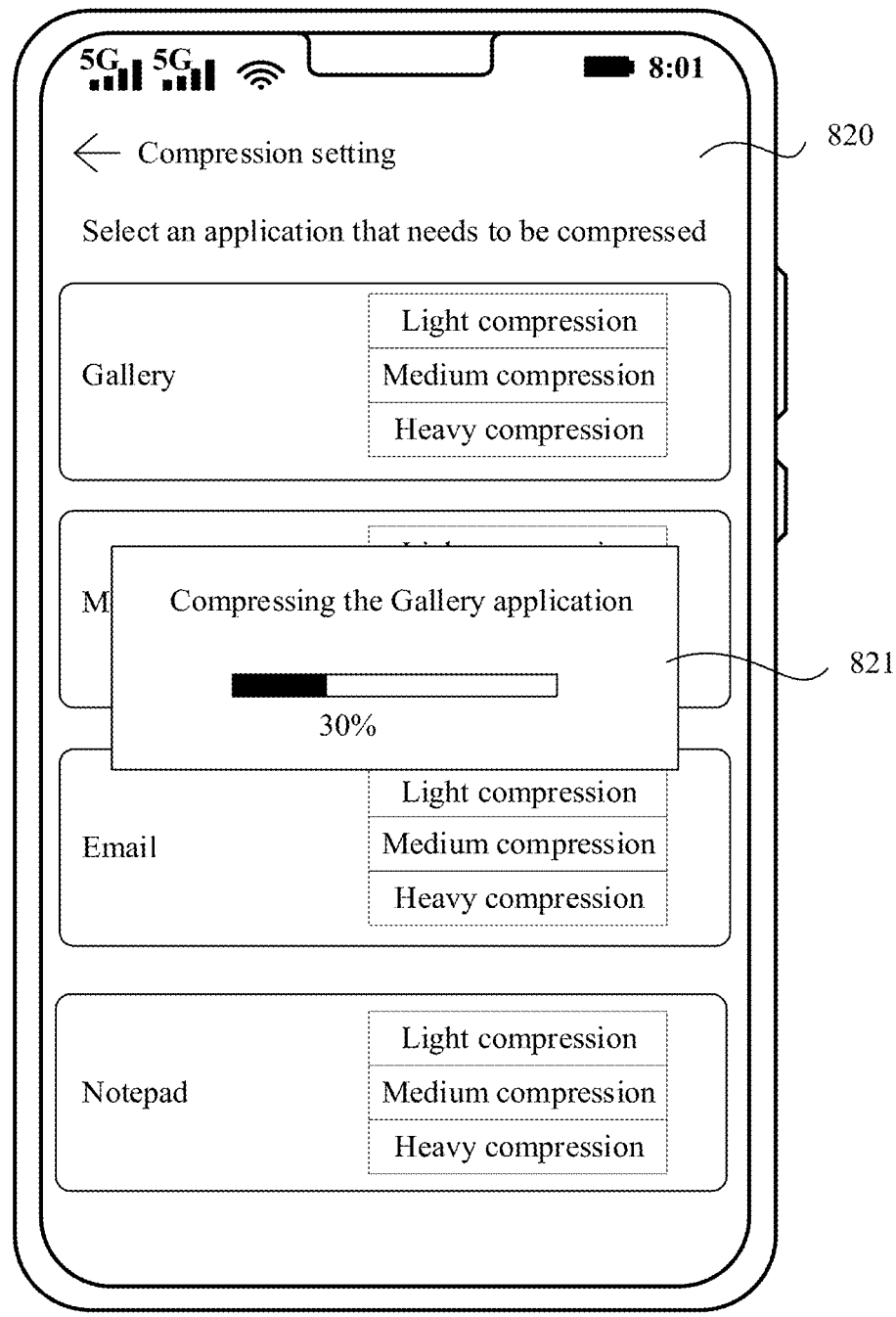

Example 2: As shown in FIG. 9A to FIG. 9C, it is assumed that the user taps a Settings application icon on a home screen of the mobile phone 100. The mobile phone 100 may respond to the tapping operation and enter a Settings application interface. For example, refer to an interface 800 shown in FIG. 9A. The interface 800 may include a compression setting option 801. Then, the user may tap the compression setting option 801 to enter a compression setting interface. For example, an interface 810 shown in FIG. 9B may be displayed. The interface 810 may include a plurality of compression manner buttons corresponding to each application, and the user may select an application by selecting a compression manner. For example, the user may tap a heavy compression button 811 in a Gallery application, and the mobile phone 100 may respond to the tapping operation of the user and compress the Gallery application. For example, an interface 820 shown in FIG. 9C may be displayed. The interface may include prompt information 821, for example, "Compressing the Gallery application" and compression progress. After the compression is completed, the mobile phone may continue to display the interface 810 shown in FIG. 9B. It should be understood that, in this example, the user does not need to separately select an application, and may directly select a compression manner to achieve an objective of simultaneously selecting an application.

It should be noted that, during actual application, the interface 720 shown in FIG. 8C and the interface 820 shown in FIG. 9C may not be displayed.

In some other embodiments, during actual product implementation, buttons of three compression manners on interfaces shown in FIG. 8A to FIG. 8C and FIG. 9A to FIG. 9C may not be displayed, and only one "Compression" button is displayed, for example, a compression button 431 shown in FIG. 5.

S302: Respond to the instruction of selecting the to-be-compressed application and the corresponding compression manner by the user and compress the to-be-compressed application in the selected compression manner.

FIG. 4A to FIG. 4C are used as an example. It is assumed that the user taps a medium compression manner button on the interface 410, and the mobile phone 100 may respond to the operation and perform medium compression on the Gallery application. For an interface after compression, refer to the interface 420 shown in FIG. 4C. The interface 420 may include an application icon after compression and an application icon before compression. In addition, an application icon of a compressed application and an application icon of an uncompressed application are different. It should be noted that, after an application is compressed, the user may distinguish between the uncompressed application and the compressed application based on an icon pattern, text information, or the like on the interface.

It should be understood that, when the application is compressed, compression may be performed according to an algorithm like Lz4, lz4fast, zstd, deflate, or gzip. All algorithms that can be used to compress an application in embodiments may fall within the protection scope.

It should be noted that the foregoing application selection manner and the user interface are merely examples for description. For example, a compression button may alternatively be added to a status bar, so that the user may select a to-be-compressed application in a manner of directly tapping the status bar to enter a compression setting interface or the like. In addition, during actual product implementation, the interface may include more or fewer controls. This is not limited in this disclosure.

In some embodiments, when the application is compressed, installation data of the application and data generated in a process of using the application are compressed. For example, in an ANDROID system, a storage path of the data may be data/data/com.xxx.xx; data/app/com.xxx.xx; sdcard/Android/data/com.xx.xx.

In another example, in a HarmonyOS system, a storage path of the data may be the following path:

(1) /data/app/base/<bundlename>
(2) /data/ce/<userId>/bundle/<bundlename>
(3) /data/ece/<userId>/bundle/<bundlename>
(4) /data/sece/<userId>/bundle/<bundlename>
(5) /mnt/hmdfs/<userId>/device_view/local/data/<bundlename>/

According to the foregoing embodiments, the user may select a to-be-compressed application and a compression manner of the application based on a requirement of the user, and then compress the application, so that storage space of an electronic device can be saved, and space utilization can be improved. In addition, user experience can be improved by selecting the to-be-compressed application and the compression manner by the user.

Figure 10:
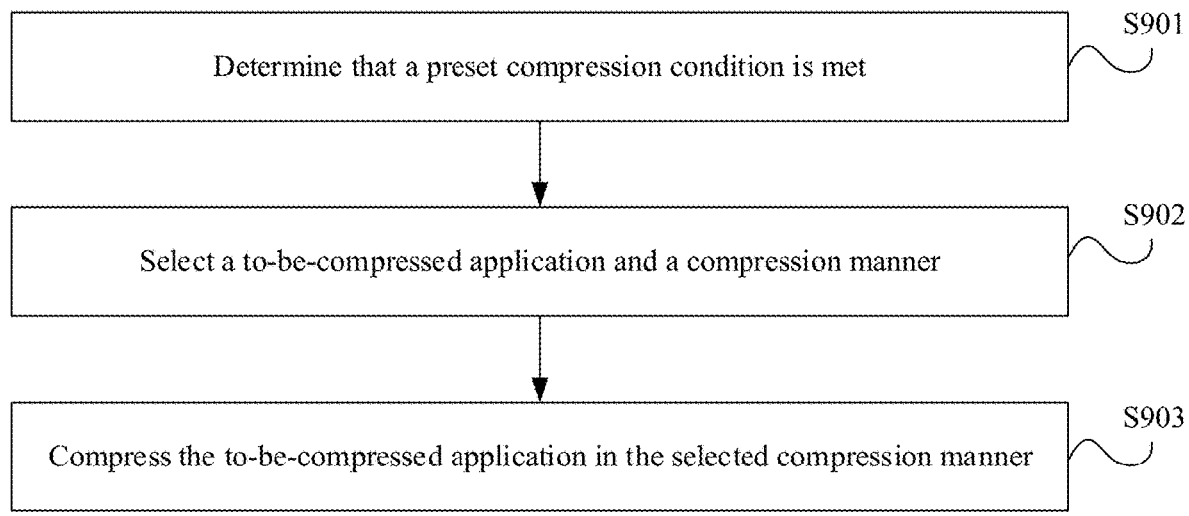
FIG. 10 is a schematic flowchart of another application compression method according to an embodiment.

The following describes an application compression method triggered by an electronic device. FIG. 10 is a flowchart of another application compression method according to an embodiment. As shown in FIG. 10, the method may include the following steps.

S901: Determine that a preset compression condition is met.

In some embodiments, the preset compression condition may include at least one of the following conditions:
(1) remaining storage space of an electronic device is less than a specified threshold. For example, when the remaining storage space is less than 5% of total storage space, application compression is triggered;
(2) an electronic device is in a screen-off state, or a user does not use the electronic device;
(3) a temperature of an electronic device does not exceed a specified temperature, for example, 45 degrees Celsius;
(4) a size of a compressible file in an electronic device exceeds a specified threshold, for example, exceeds 10 GB;
(5) an estimated benefit (namely, a size of space that can be saved after compression) obtained after a compressible file in an electronic device is compressed is greater than a specified threshold, for example, greater than 1 GB; or
(6) a state of charge of an electronic device is sufficient, where, for example, a state of charge of the electronic device is greater than 60%.

In some embodiments, if the state of charge is insufficient, compression may be triggered when a battery of the electronic device is in a charging state and the state of charge is greater than a specified state of charge (for example, 60%). The specified state of charge may alternatively be another value, for example, 50%. This is not limited in this disclosure.

S902: Select a to-be-compressed application and a compression manner.

In a possible implementation, the electronic device may select the to-be-compressed application based on a state of using an application by the user. For example, the electronic device may select an application that is frequently used by the user as the to-be-compressed application. An application that is not frequently used may alternatively be selected as the to-be-compressed application. This is not limited in this disclosure.

In another possible implementation, the electronic device may select the to-be-compressed application based on storage space occupied by an application. For example, the electronic device may select an application that occupies large storage space as the to-be-compressed application. For example, the electronic device may sort storage space occupied by applications, and then select applications whose occupied storage space ranks first N (where N is a positive integer) as the to-be-compressed applications.

In some embodiments, the electronic device may select a compression manner based on usage of an application. For example, light compression may be selected for a frequently used application, medium compression may be selected for an occasionally used application, and heavy compression may be selected for an almost unused application. It should be understood that the frequently used application may be an application whose quantity of use times within specified time is greater than a first specified threshold, the occasionally used application may be an application whose quantity of use times within specified time is greater than a second specified threshold and less than the first specified threshold, and the almost unused application is an application whose quantity of use times within specified time is less than the second specified threshold. For different applications, different compression manners may be selected, or a same compression manner may be selected. This is not limited in this disclosure.

S903: Compress the to-be-compressed application in the selected compression manner.

It should be understood that S903 in embodiments shown in FIG. 10 is the same as S302 in embodiments shown in FIG. 3. For an example implementation process, refer to the detailed descriptions of S302 in embodiments shown in FIG. 3. Details are not described herein again.

The foregoing embodiments describe an application compression process. The following separately describes an application decompression process in the foregoing several manners of selecting a compression application.

Figure 11A:
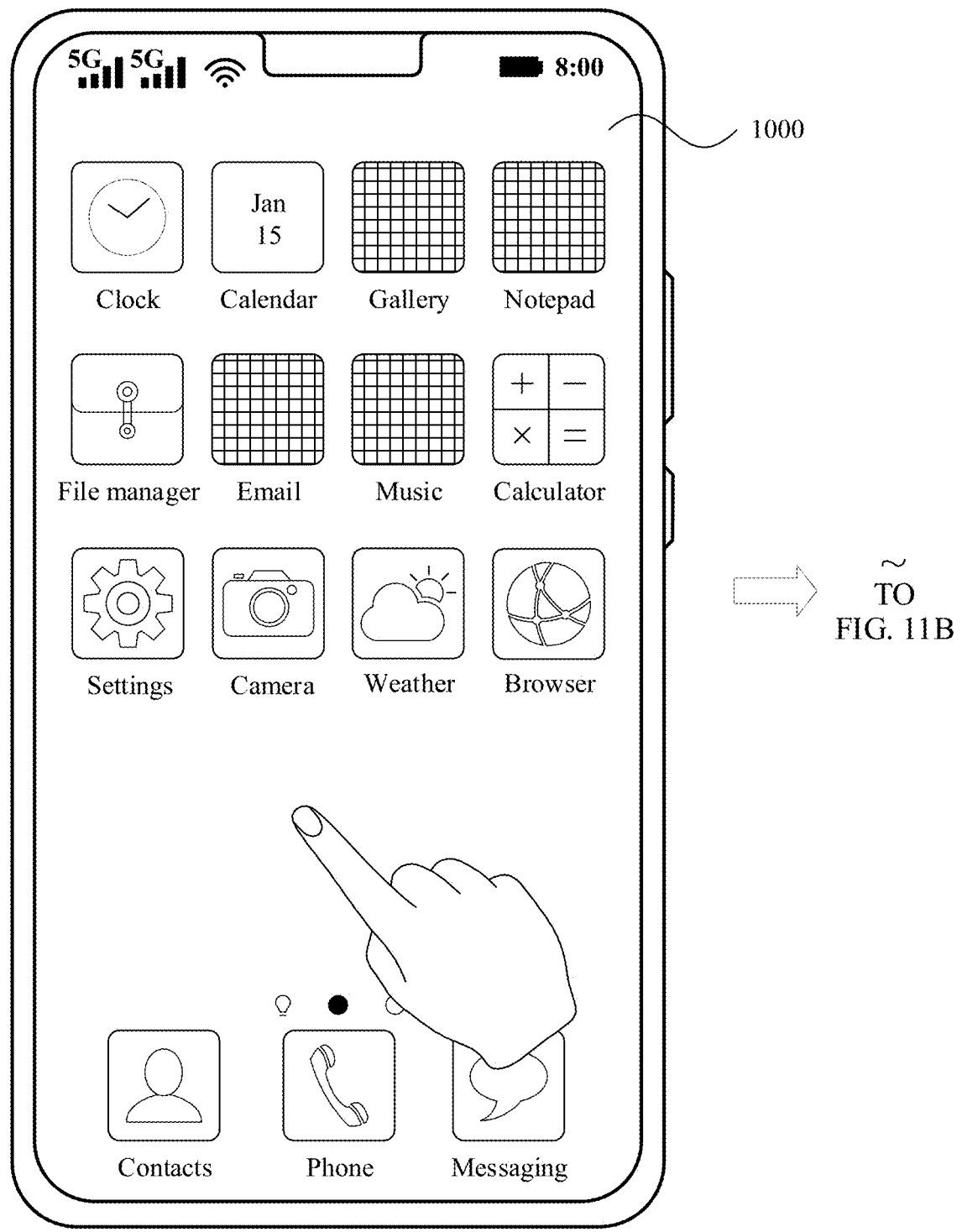
FIG. 11A to FIG. 11C are a diagram of a user interface for decompressing an application according to an embodiment.
Figure 11B:
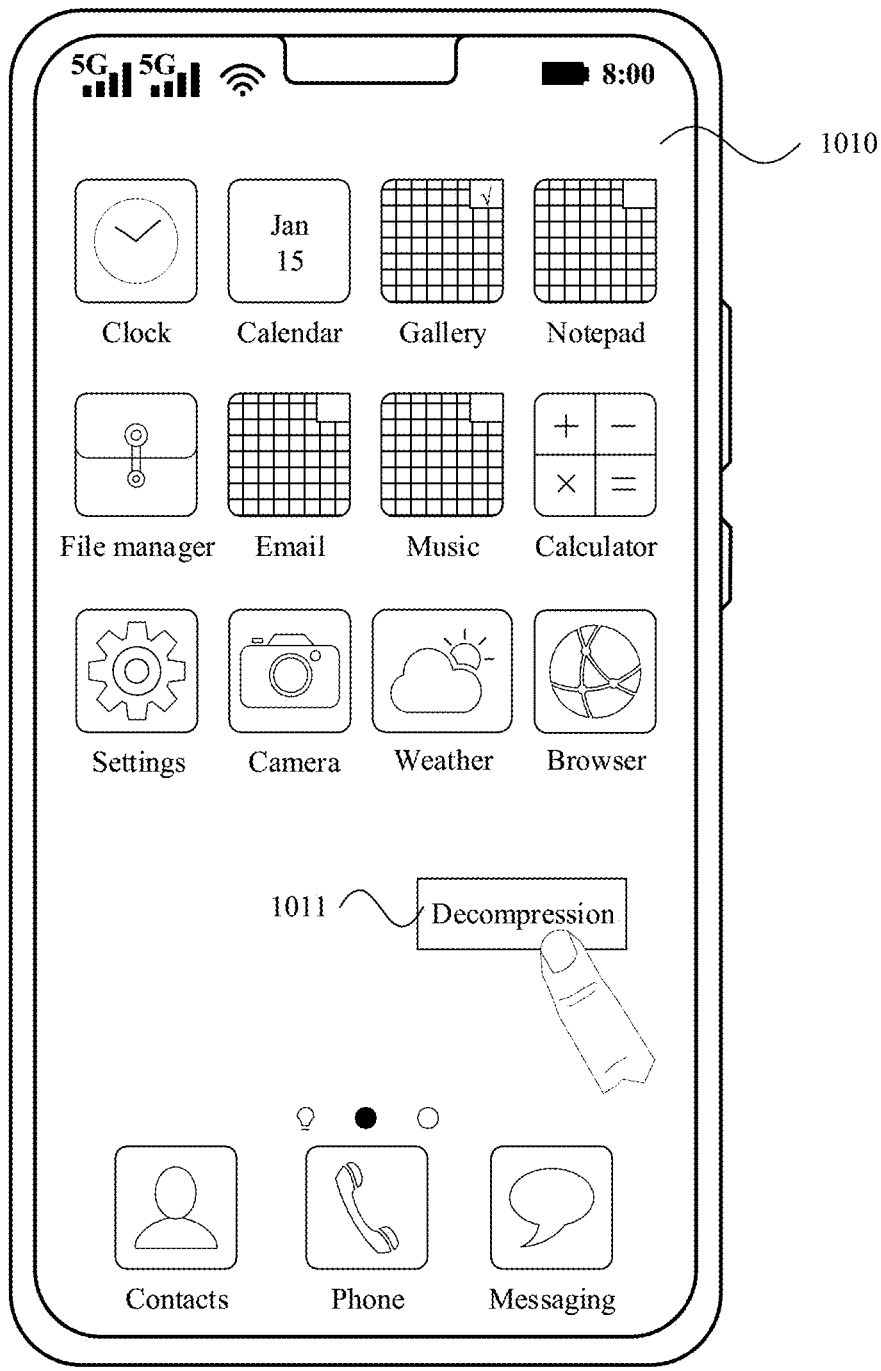
Figure 11C:
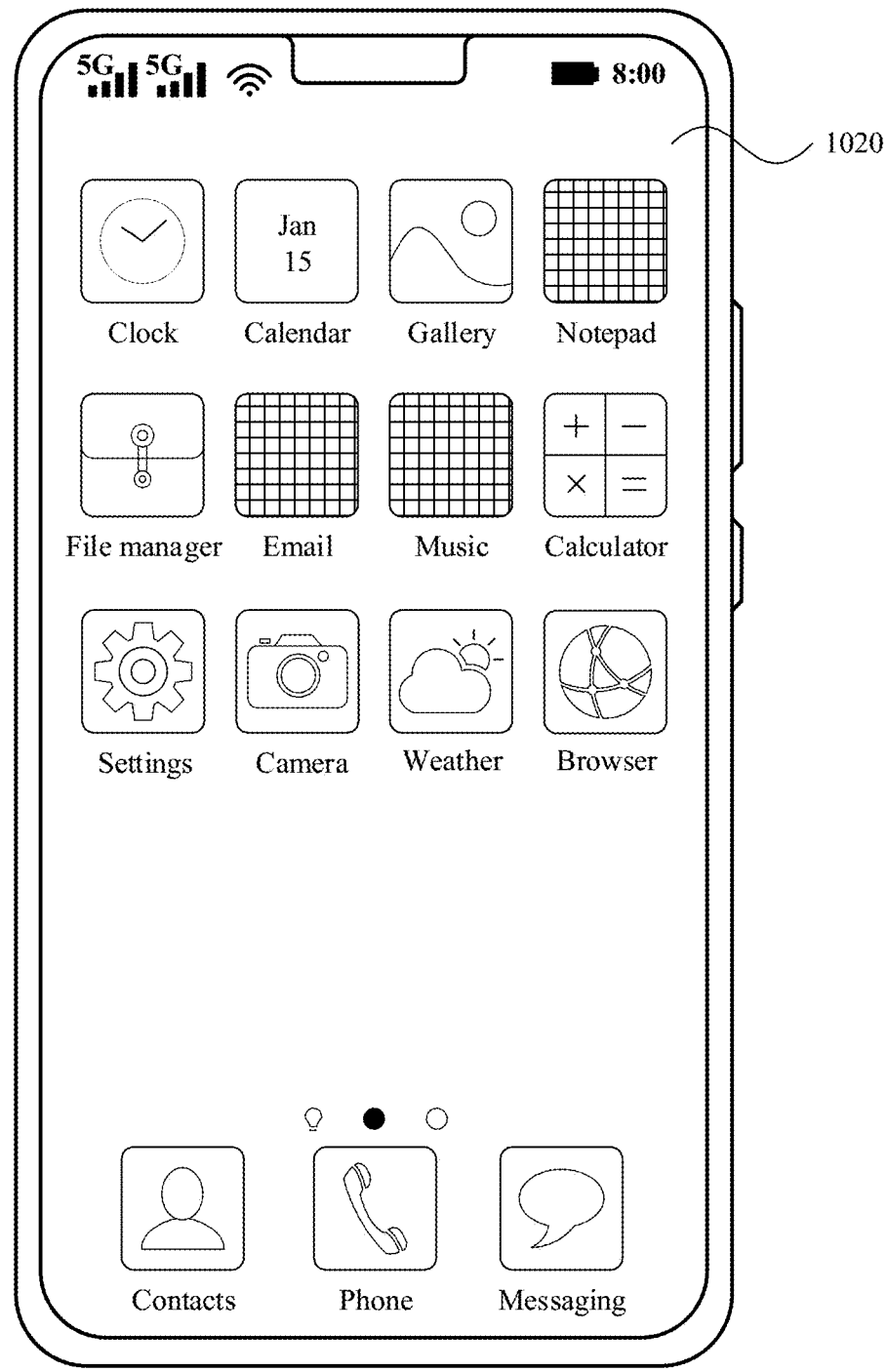

Example 1: As shown in FIG. 11A to FIG. 11C, it is assumed that a user selects a plurality of to-be-compressed applications. For example, an interface after applications are compressed is an interface 1000 shown in FIG. 11A. The mobile phone 100 may detect a gesture operation of the user on the interface 1000, and trigger the compressed applications to enter an editing state.

In some embodiments, the gesture operation may be a touch and hold operation performed by the user at a blank location on the interface 1000. The mobile phone 100 may respond to the touch and hold operation of the user and display an interface 1010 shown in FIG. 11B. The interface 1010 may include icons of compressed applications in the editing state and a decompression button 1011. The user may select, on the interface 1010, a to-be-decompressed application. For example, the user may select a compressed Gallery application on the interface 1010 (for example, a v mark may be displayed in a selection box of the compressed Gallery application), and then tap the decompression button 1011. The mobile phone 100 may respond to the tapping operation and decompress the Gallery application. After the decompression is completed, refer to an interface 1020 shown in FIG. 11C.

Figure 12A:
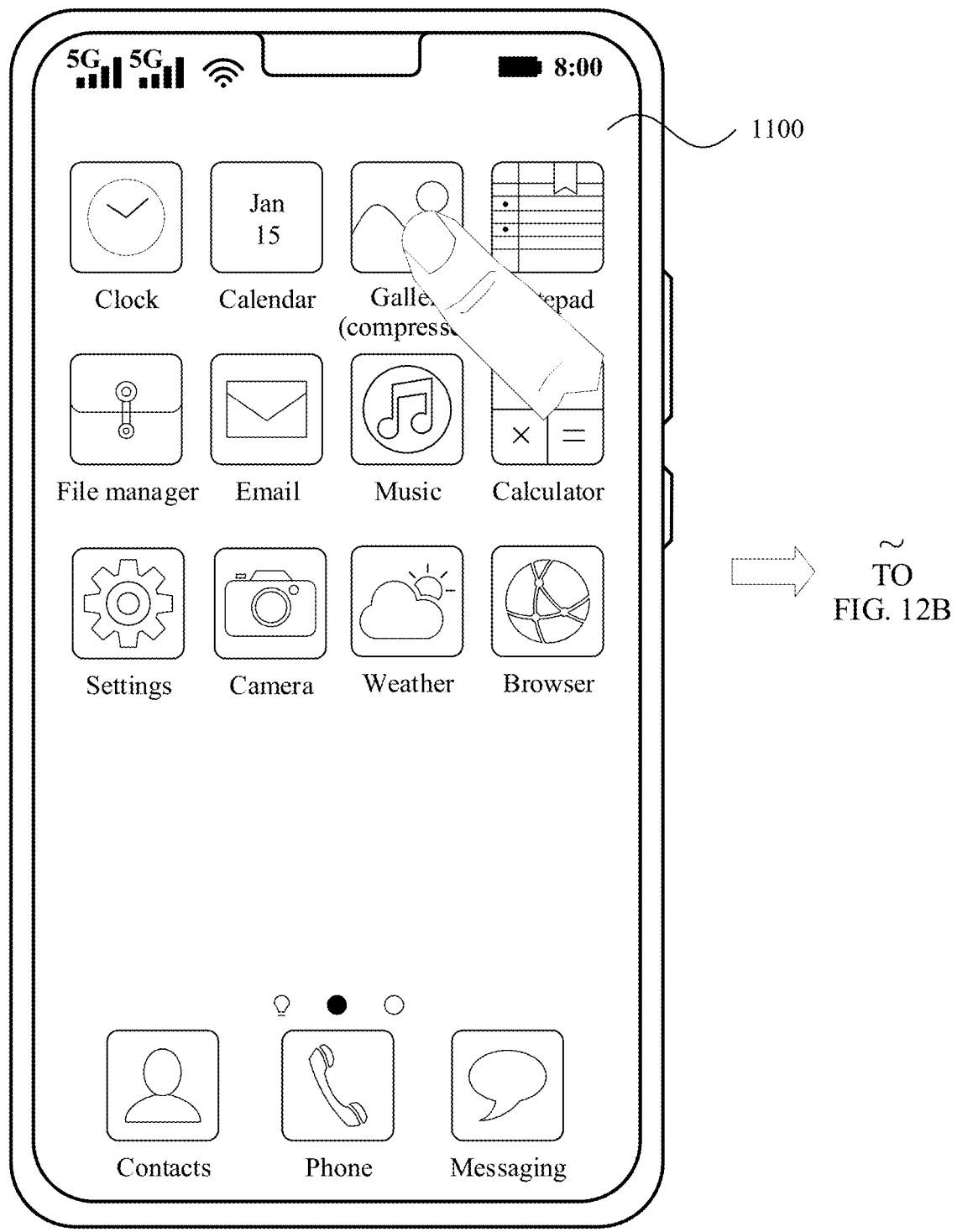
FIG. 12A and FIG. 12B are a diagram of another user interface for decompressing an application according to an embodiment.
Figure 12B:
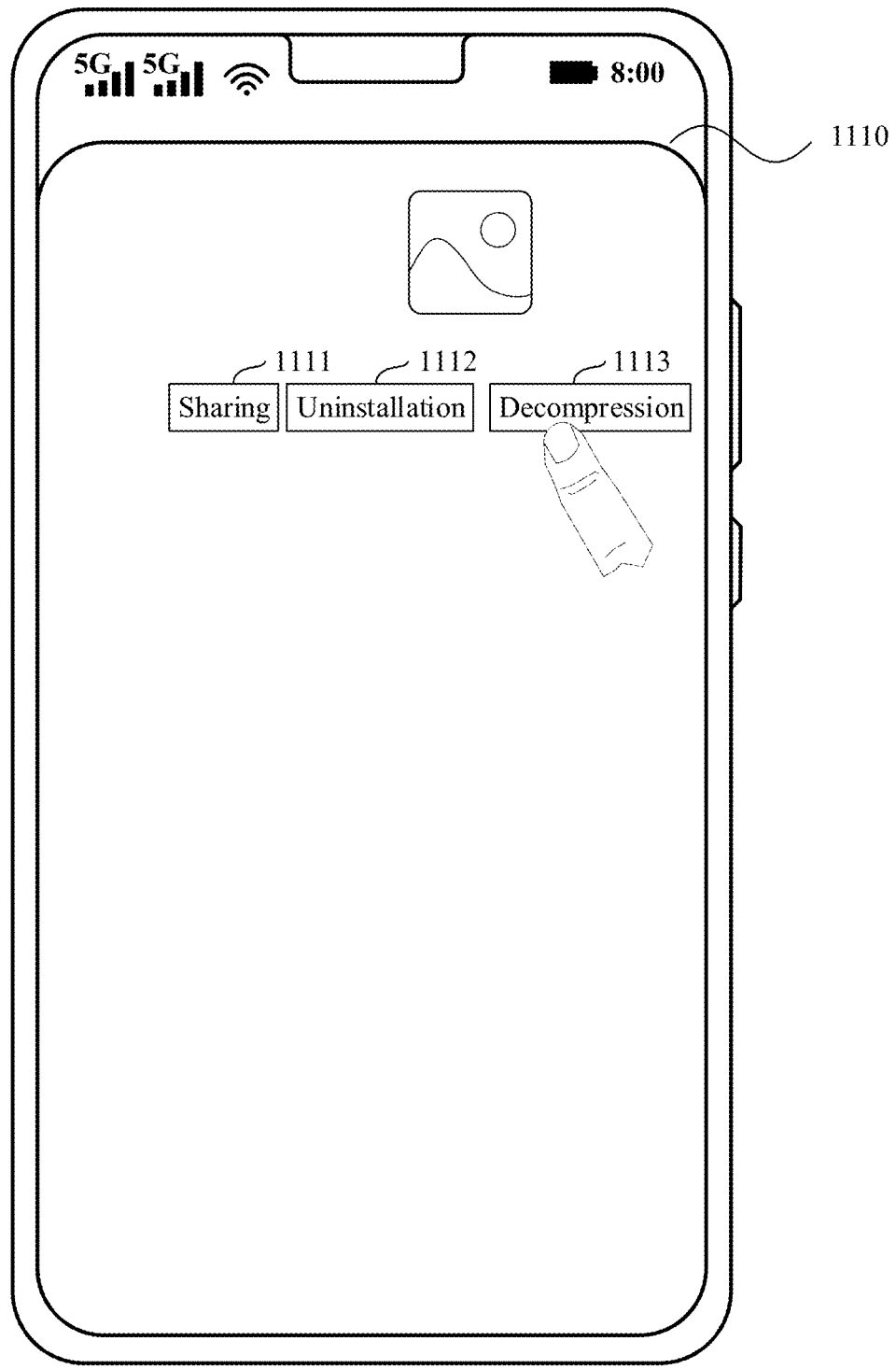

Example 2: As shown in FIG. 12A and FIG. 12B, on an interface 1100 after an application is compressed, the mobile phone 100 may detect a gesture operation of a user on the interface. For example, the gesture operation may be a touch and hold operation performed by the user on a Gallery application icon on the interface 1100 shown in FIG. 12A. The mobile phone 100 may respond to the touch and hold operation and display an interface 1110 shown in FIG. 12B. The interface 1110 may include a sharing button 1111, an uninstallation button 1112, and a decompression button 1113. The user may tap the decompression button 1113 on the interface 1110, and the mobile phone 100 may respond to the tap operation and decompress a Gallery application.

It should be understood that the foregoing two examples are merely examples for description, and the gesture operation may alternatively be another operation, or may be a voice trigger operation or the like. In addition, in embodiments, when selecting a to-be-compressed application/to-be-decompressed application, the user may select a plurality of applications to perform batch compression/decompression.

Figure 13A:
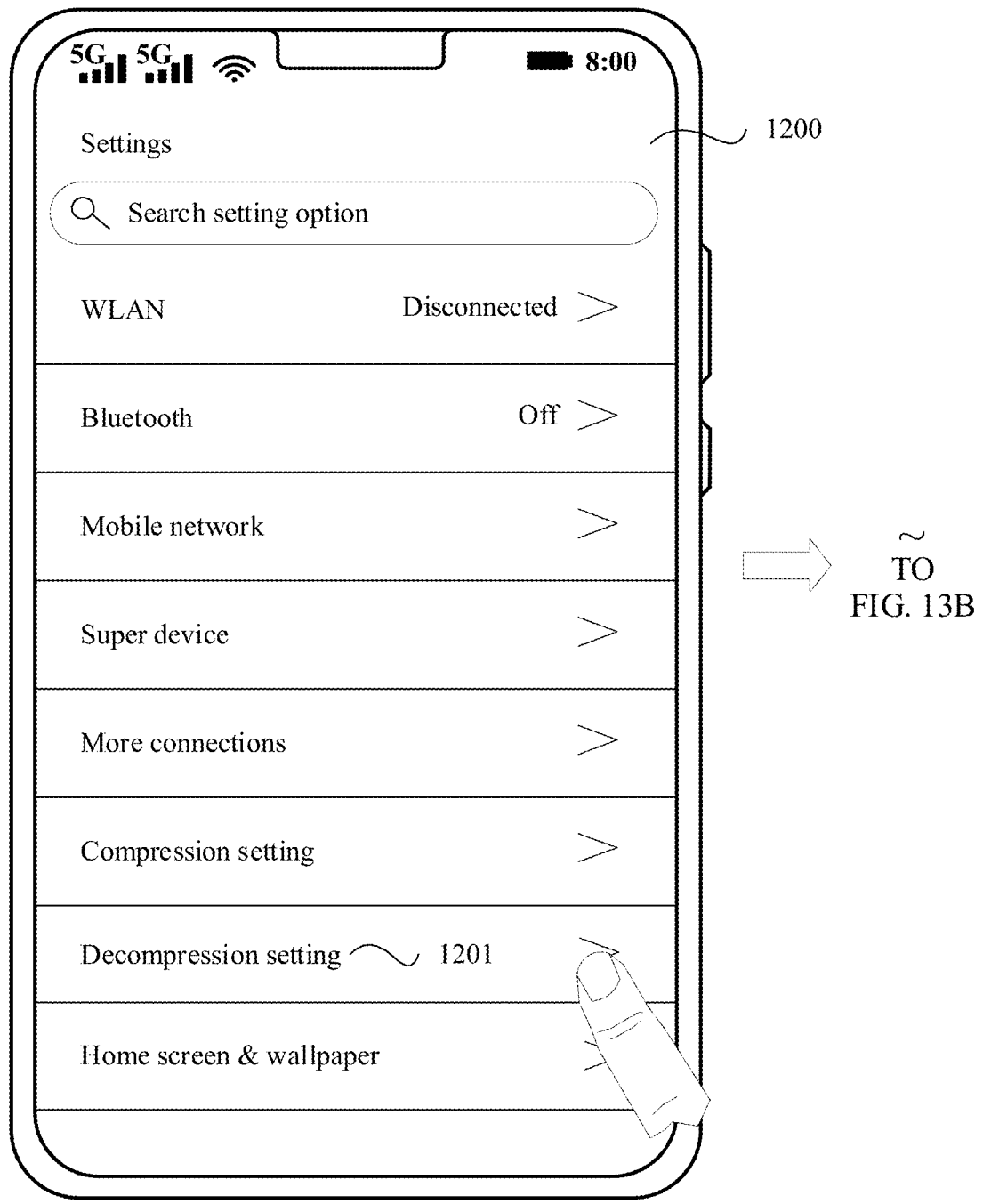
FIG. 13A to FIG. 13C are a diagram of another user interface for decompressing an application according to an embodiment.
Figure 13B:
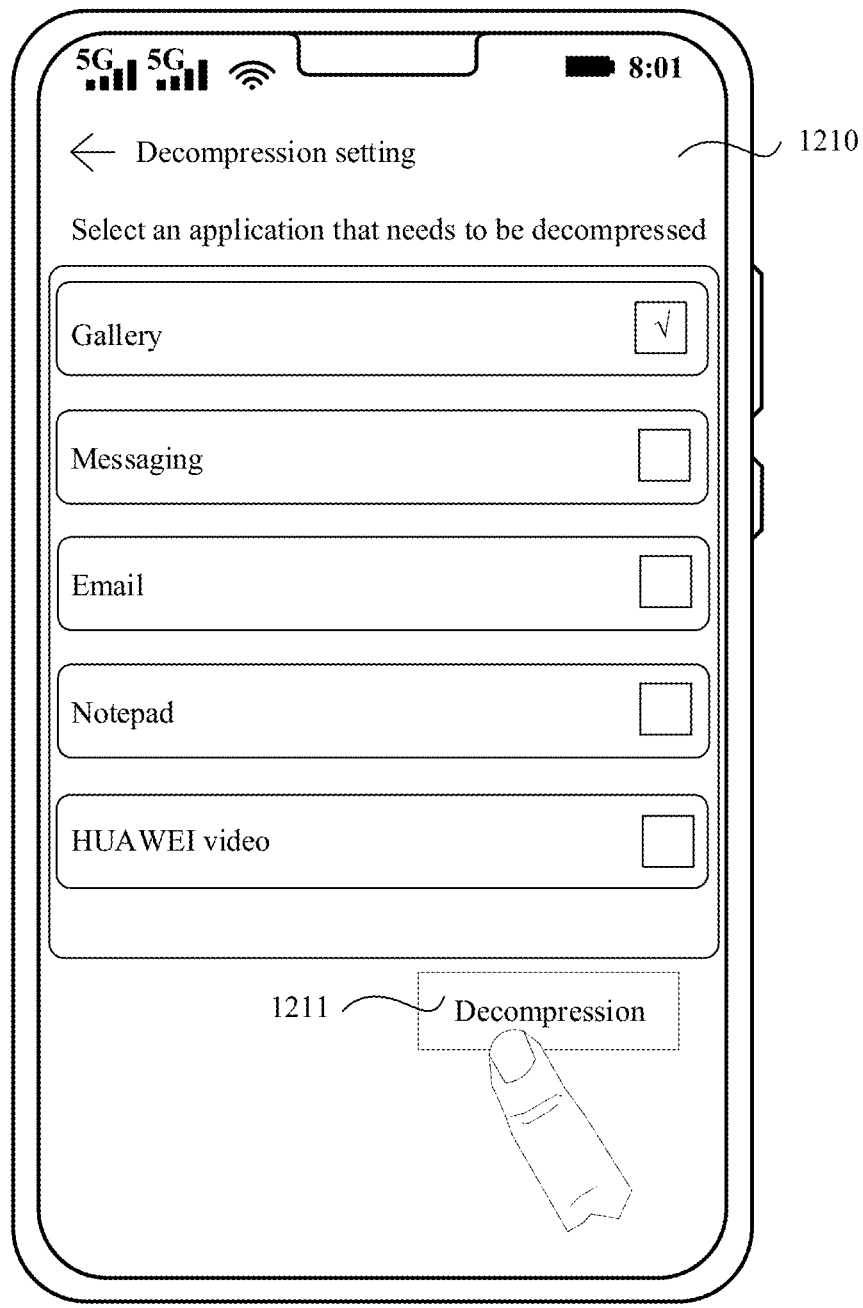
Figure 13C:
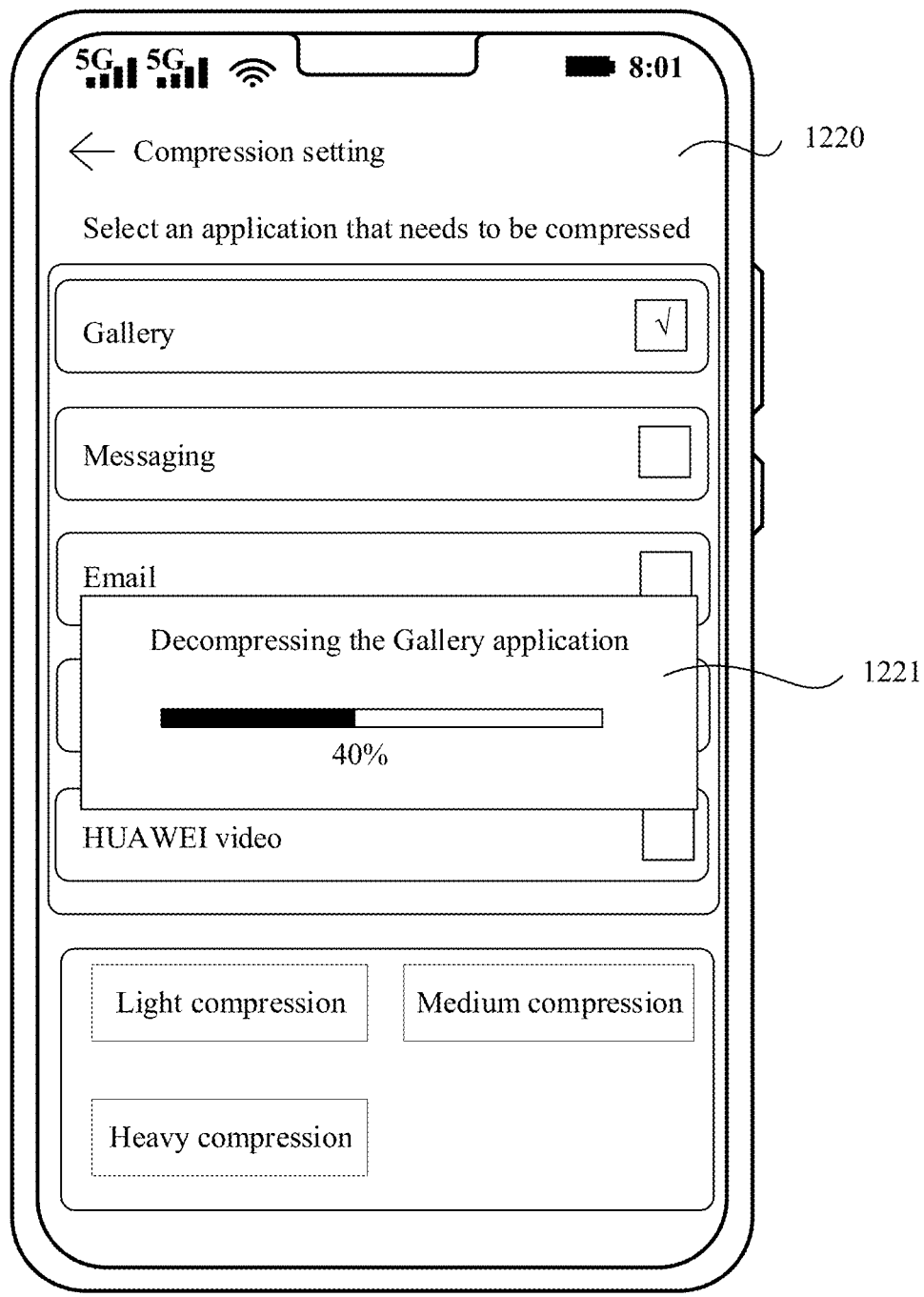

Example 3: As shown in FIG. 13A to FIG. 13C, it is assumed that the mobile phone 100 displays an interface 1200 shown in FIG. 13A, and the interface 1200 may include a decompression setting option 1201. After a user taps the decompression setting option 1201, the mobile phone 100 may respond to the tapping operation and enter a decompression setting interface. For example, an interface 1210 shown in FIG. 13B is displayed. A list of compressed applications may be displayed on the interface 1210. The user may select, on the interface, an application that needs to be decompressed. For example, the user may select a Gallery application, and then tap a decompression button 1211. The mobile phone 100 may respond to the tap operation on the decompression button 1211 and decompress the Gallery application. For example, an interface 1220 shown in FIG. 13C may be displayed. The interface 1220 may include prompt information 1221. For example, the prompt information may be "Decompressing the Gallery application" and a decompression progress bar. The user may view decompression progress based on the decompression progress bar. After the decompression is completed, the interface 1210 shown in FIG. 13B may continue to be displayed. During actual product implementation, after the decompression is completed, the mobile phone 100 may alternatively return to a home screen or the like. This is not limited in this disclosure.

Figure 14A:
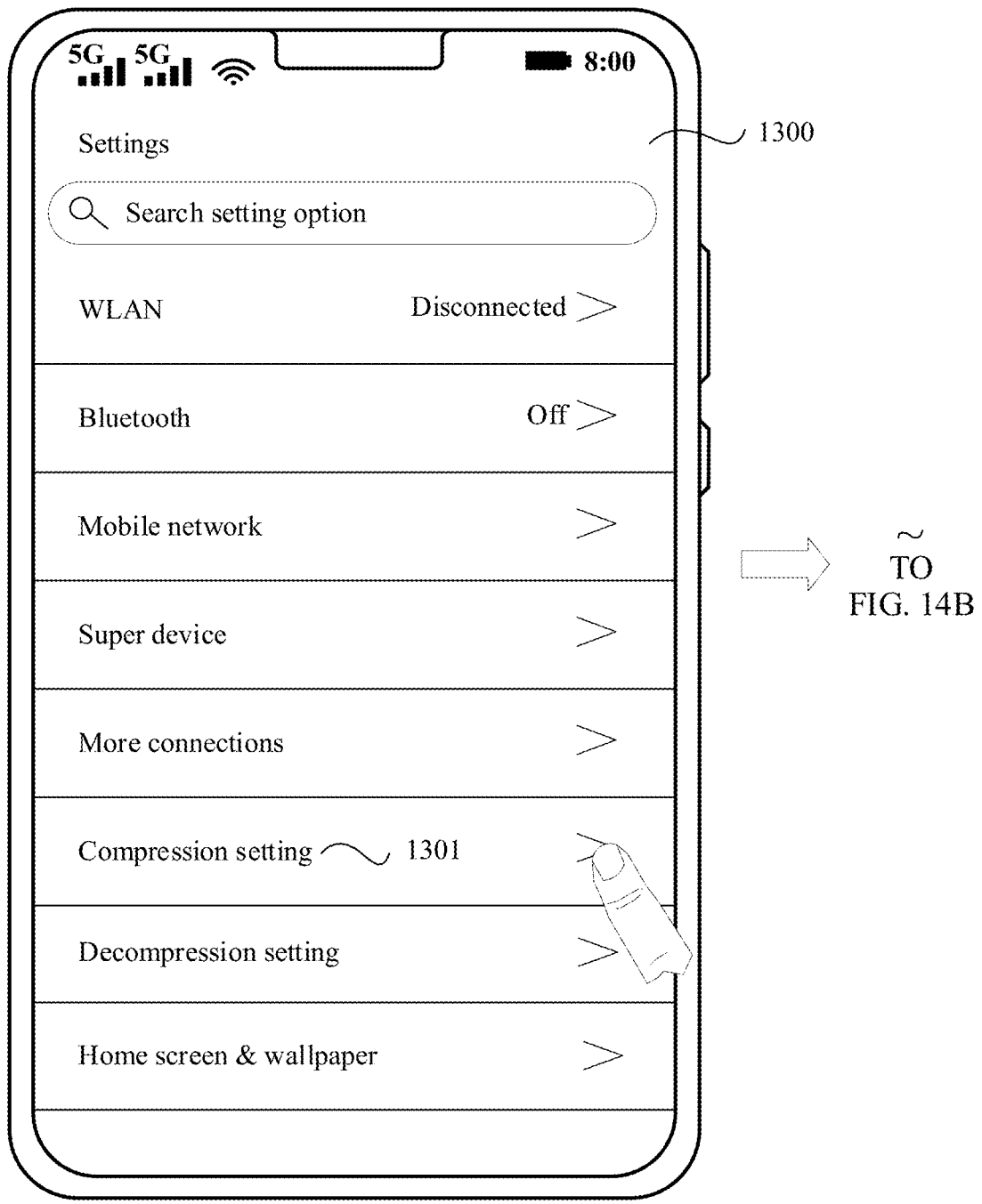
FIG. 14A to FIG. 14D are a diagram of a user interface for decompressing an application according to an embodiment.
Figure 14B:
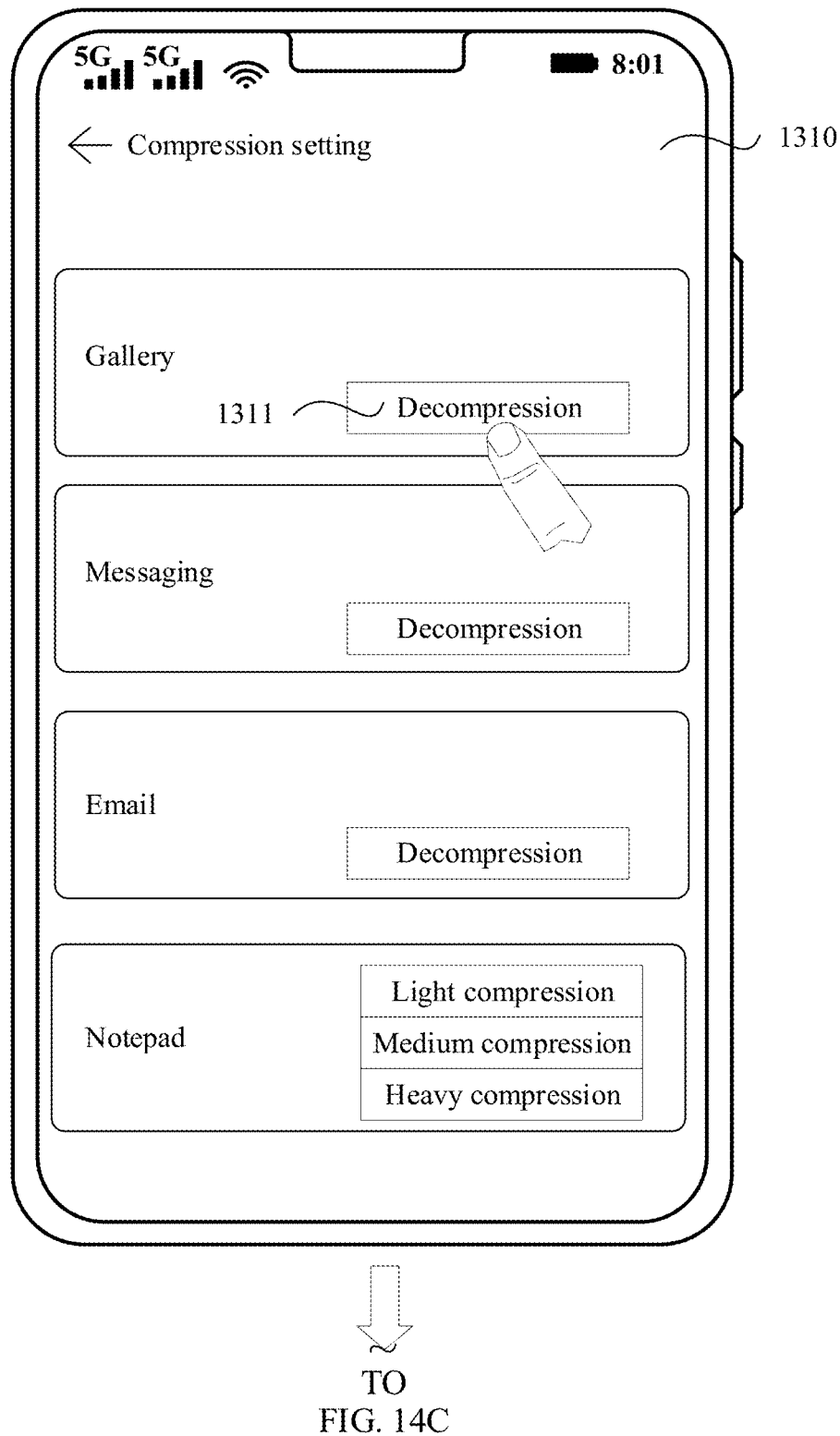
Figure 14C:
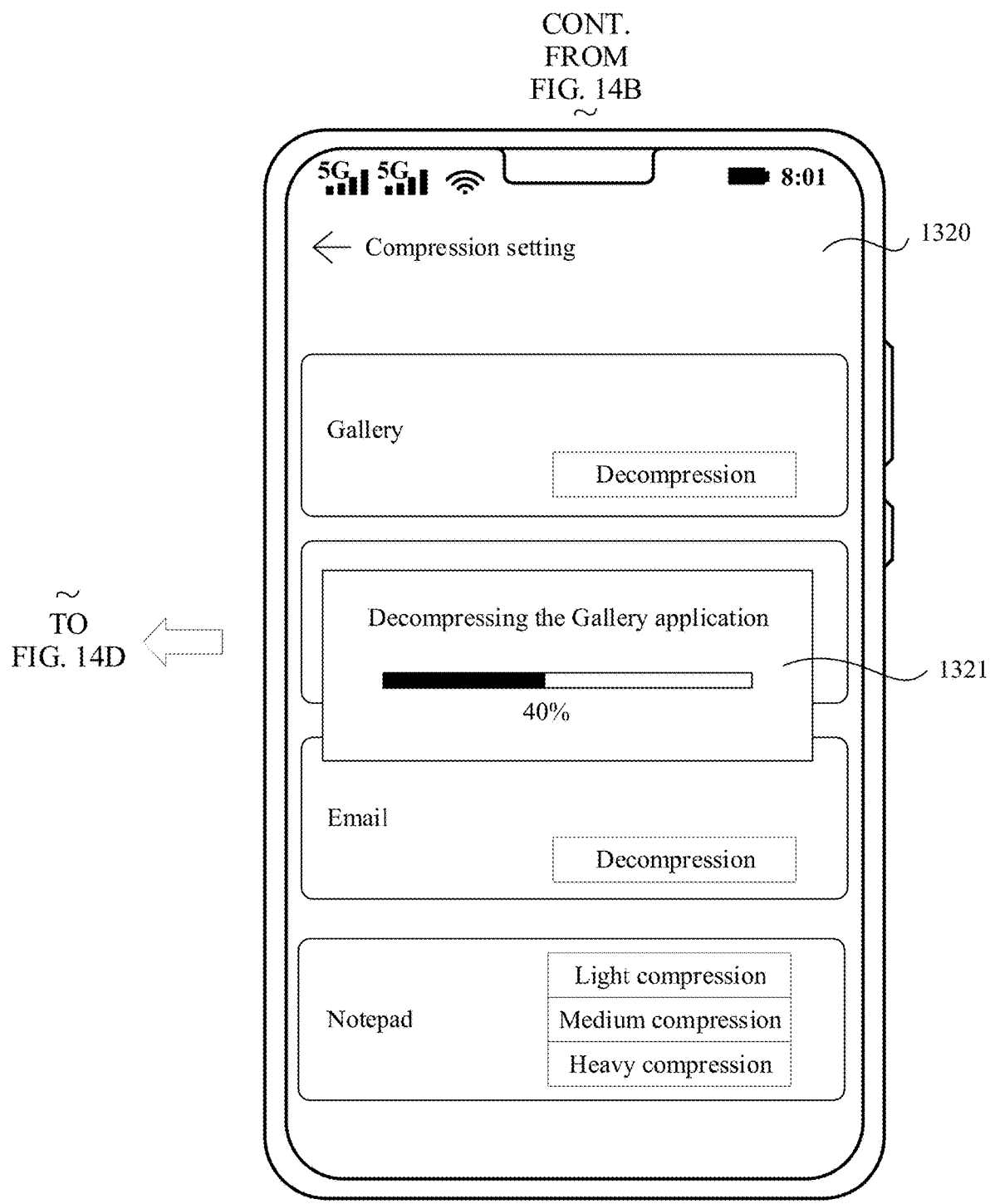
Figure 14D:
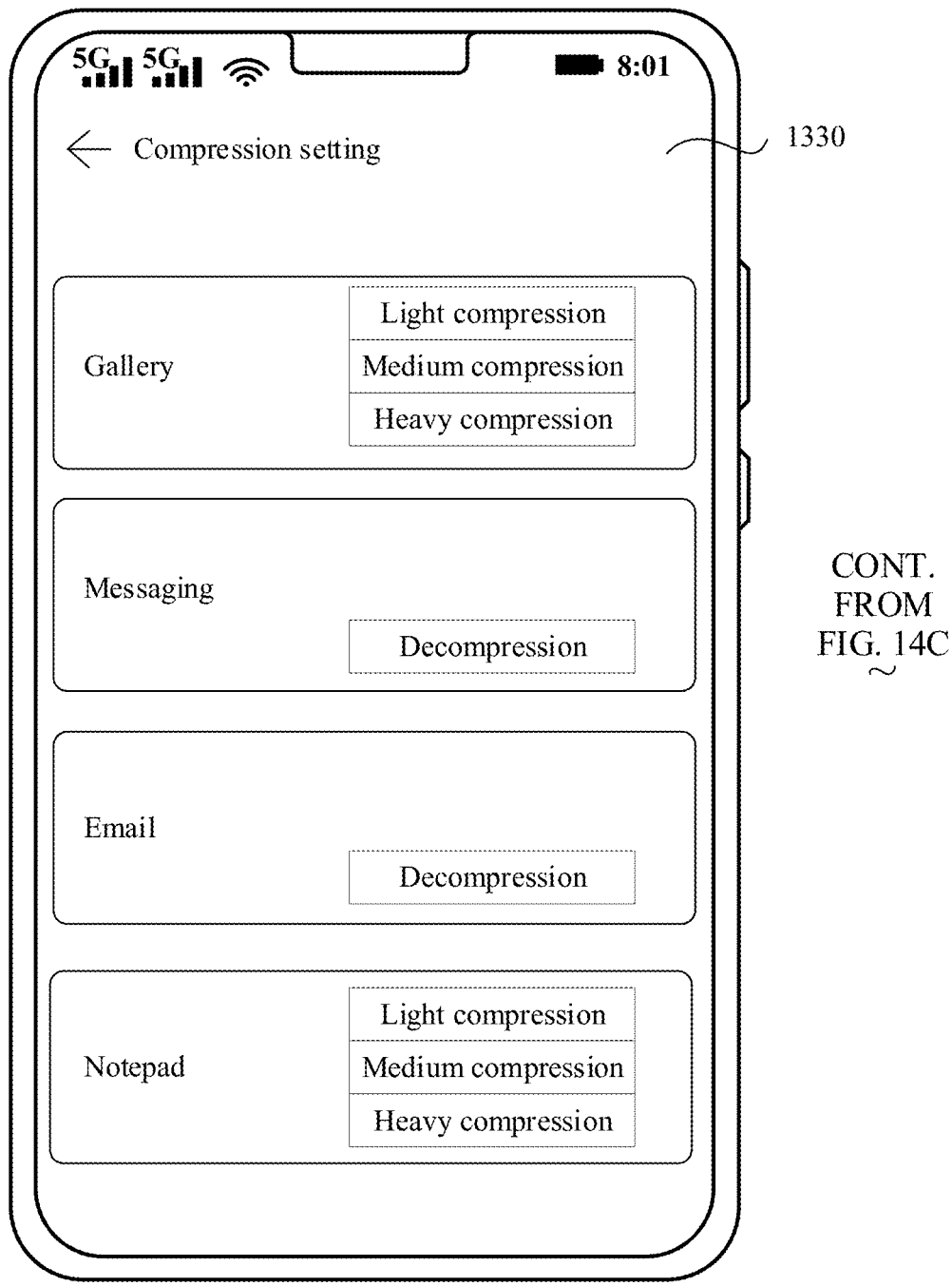

Example 4: As shown in FIG. 14A to FIG. 14D, it is assumed that the mobile phone 100 displays an interface 1300 shown in FIG. 14A, and the interface 1300 may include a compression setting option 1301. After a user taps the compression setting option 1301, the mobile phone 100 may respond to the tapping operation and enter a compression setting interface. For example, an interface 1310 shown in FIG. 14B is displayed. The interface 1310 may include a list of compressed applications and a list of uncompressed applications. It is assumed that a Gallery is a compressed application. When the user taps a decompression button 1311 of the Gallery application, the mobile phone 100 may respond to the tapping operation of the user and decompress the Gallery application. For example, an interface 1320 shown in FIG. 14C may be displayed. The interface 1320 may include prompt information 1321. For example, the prompt information may be "Decompressing the Gallery application" and a decompression progress bar. After the compression is completed, the mobile phone 100 may display an interface 1330 shown in FIG. 14D, and compression identifiers in a rectangular box in which the Gallery application is located on the interface 1330 change.

Because the application is not deleted when the application is compressed, in embodiments, after the compressed application is decompressed, the application may be directly used, and the application does not need to be reinstalled.

The following continues to describe how a user uses a compressed application after the application is compressed.

Figure 15A:
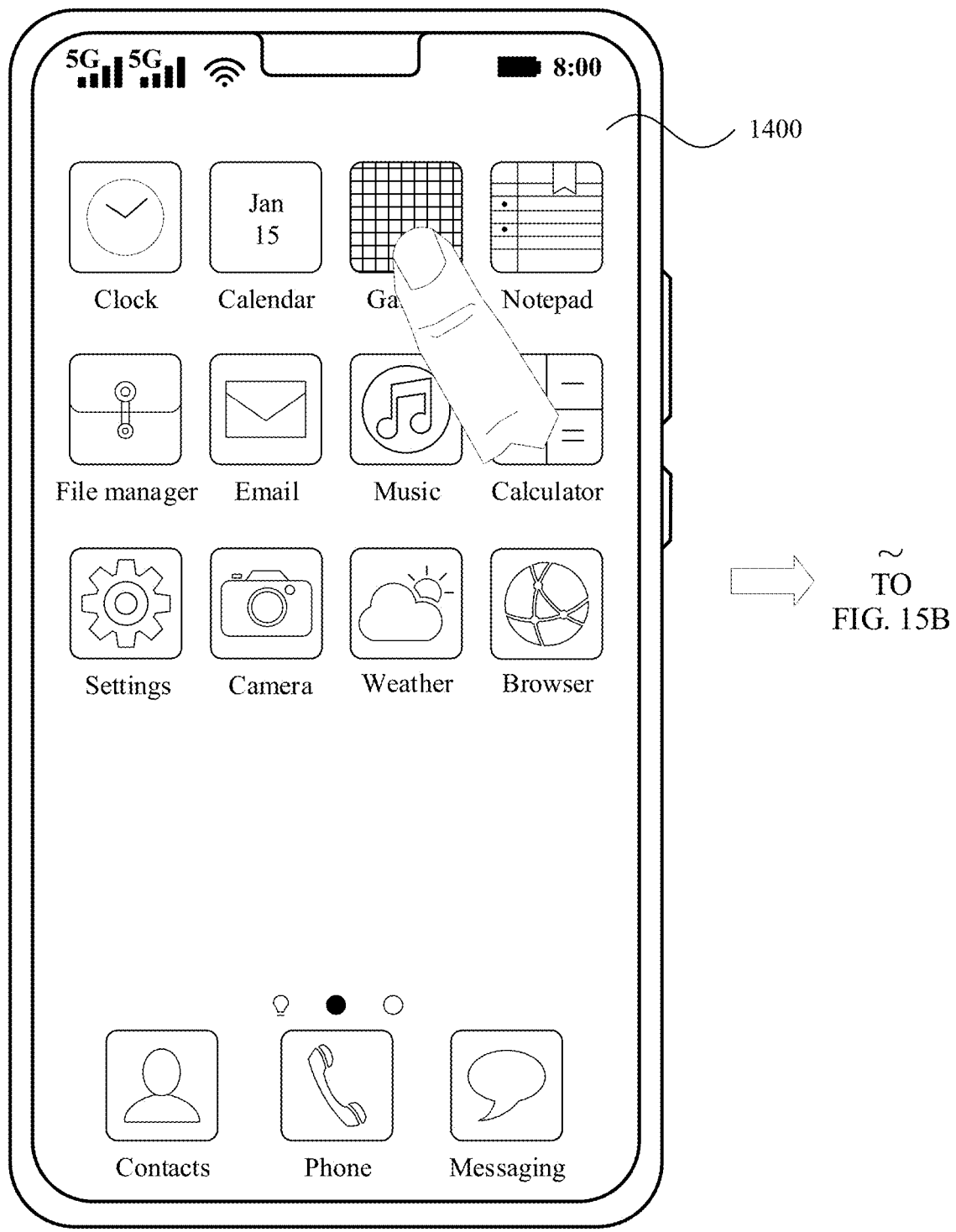
FIG. 15A and FIG. 15B are a diagram of a user interface for starting a compressed application according to an embodiment.
Figure 15B:
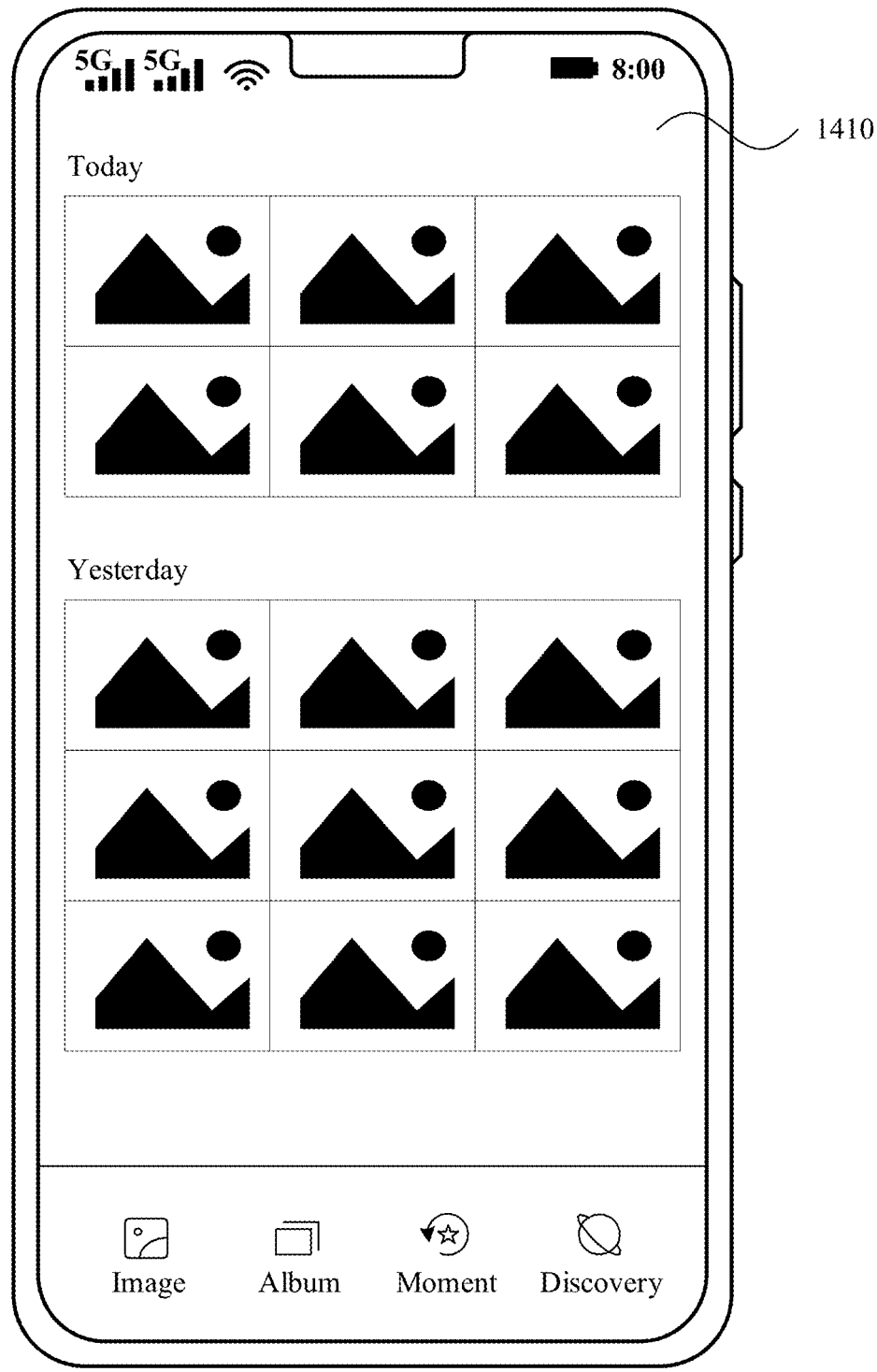

In some embodiments, the compressed application may be started while being decompressed, that is, the application may be normally started. In a decompression process, a file system may directly transfer decompressed data to the application, and the decompression process is not perceptible to the application. Therefore, time can be shortened, efficiency can be improved, and user experience can be improved. For example, as shown in FIG. 15A and FIG. 15B, it is assumed that the mobile phone 100 displays a home screen 1400 shown in FIG. 15A, and a Gallery application on the home screen 1400 is a compressed application. After the user taps an application icon of the compressed Gallery, the mobile phone 100 may respond to the operation and start the Gallery application and display an application interface of the Gallery, for example, display an interface 1410 shown in FIG. 15B.

Figure 16A:
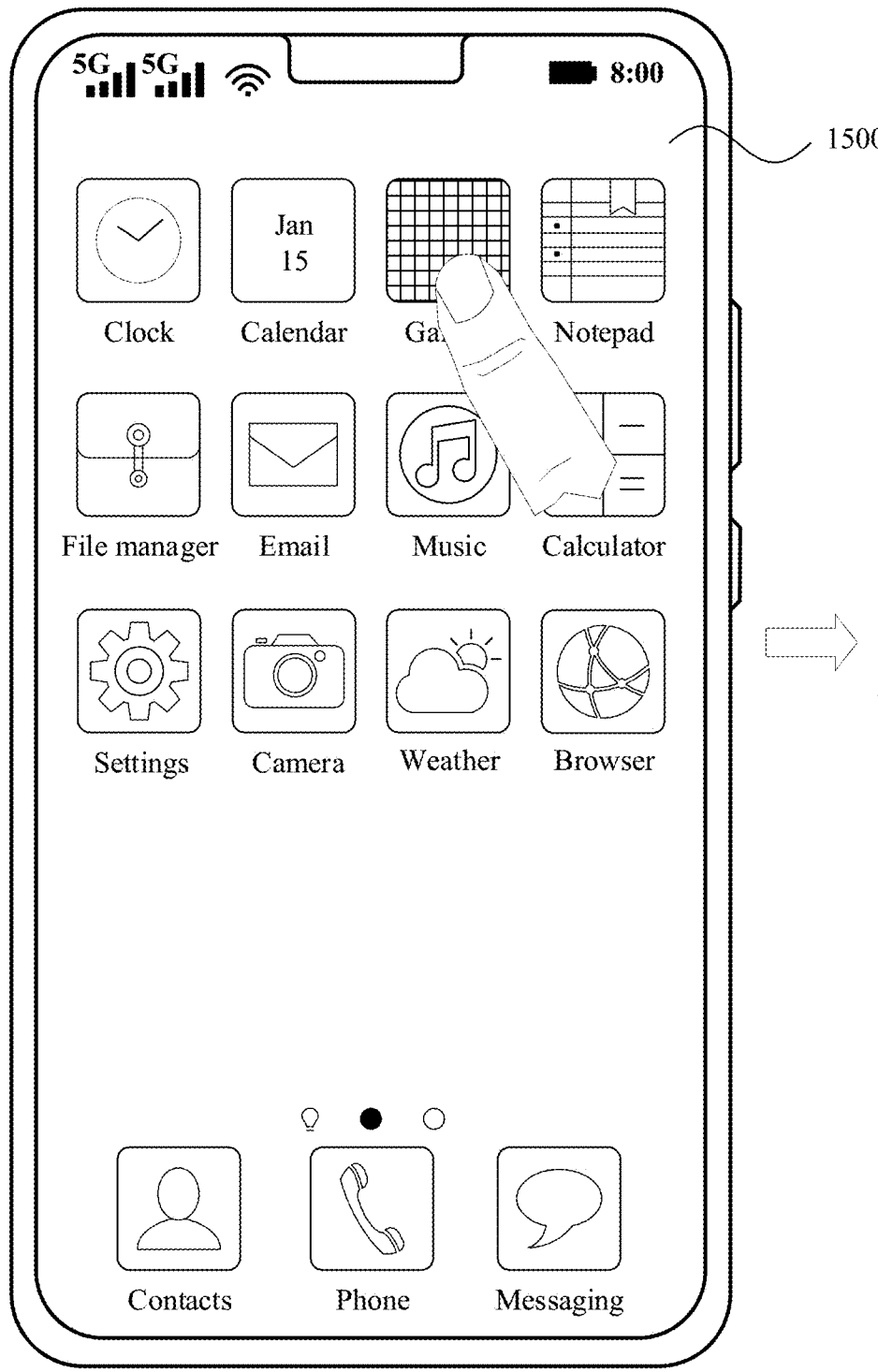
FIG. 16A to FIG. 16C are a diagram of another user interface for starting a compressed application according to an embodiment.
Figure 16B:
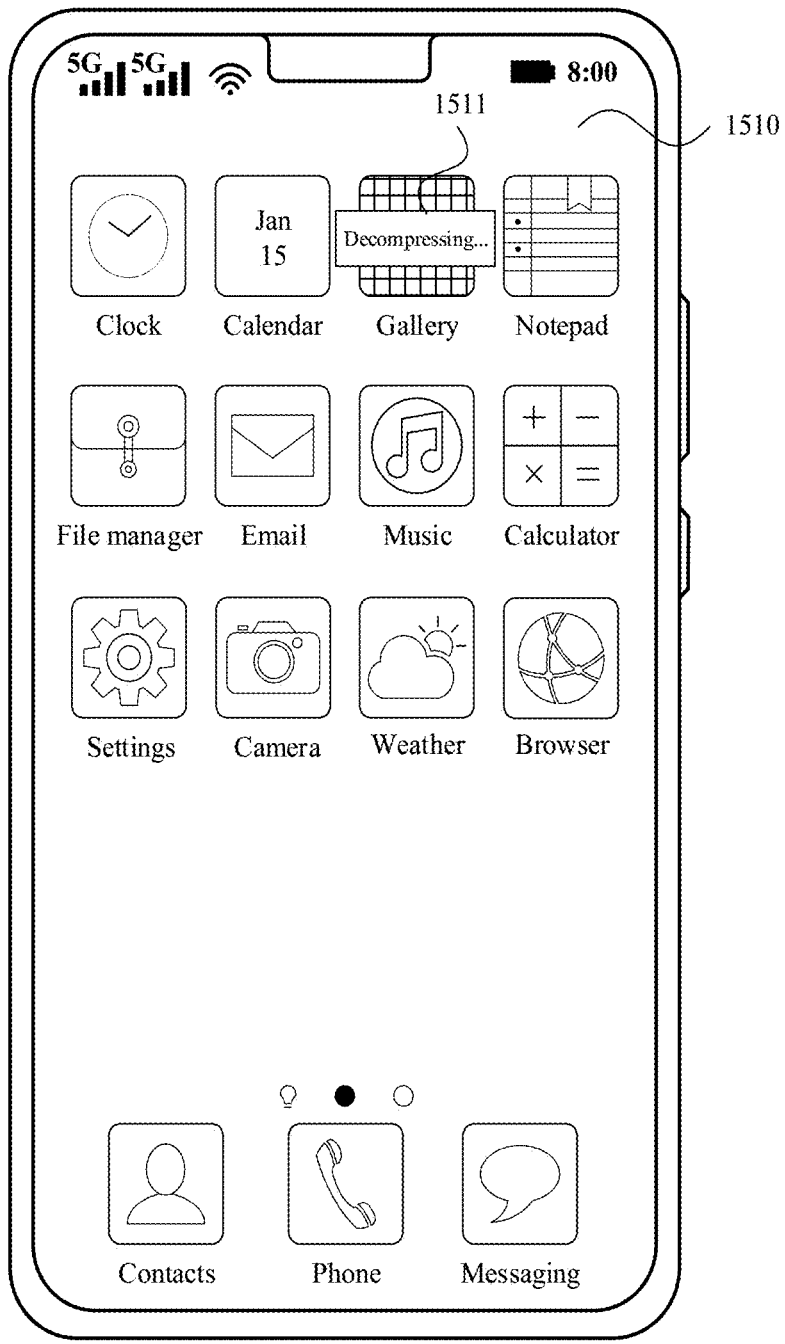
Figure 16C:
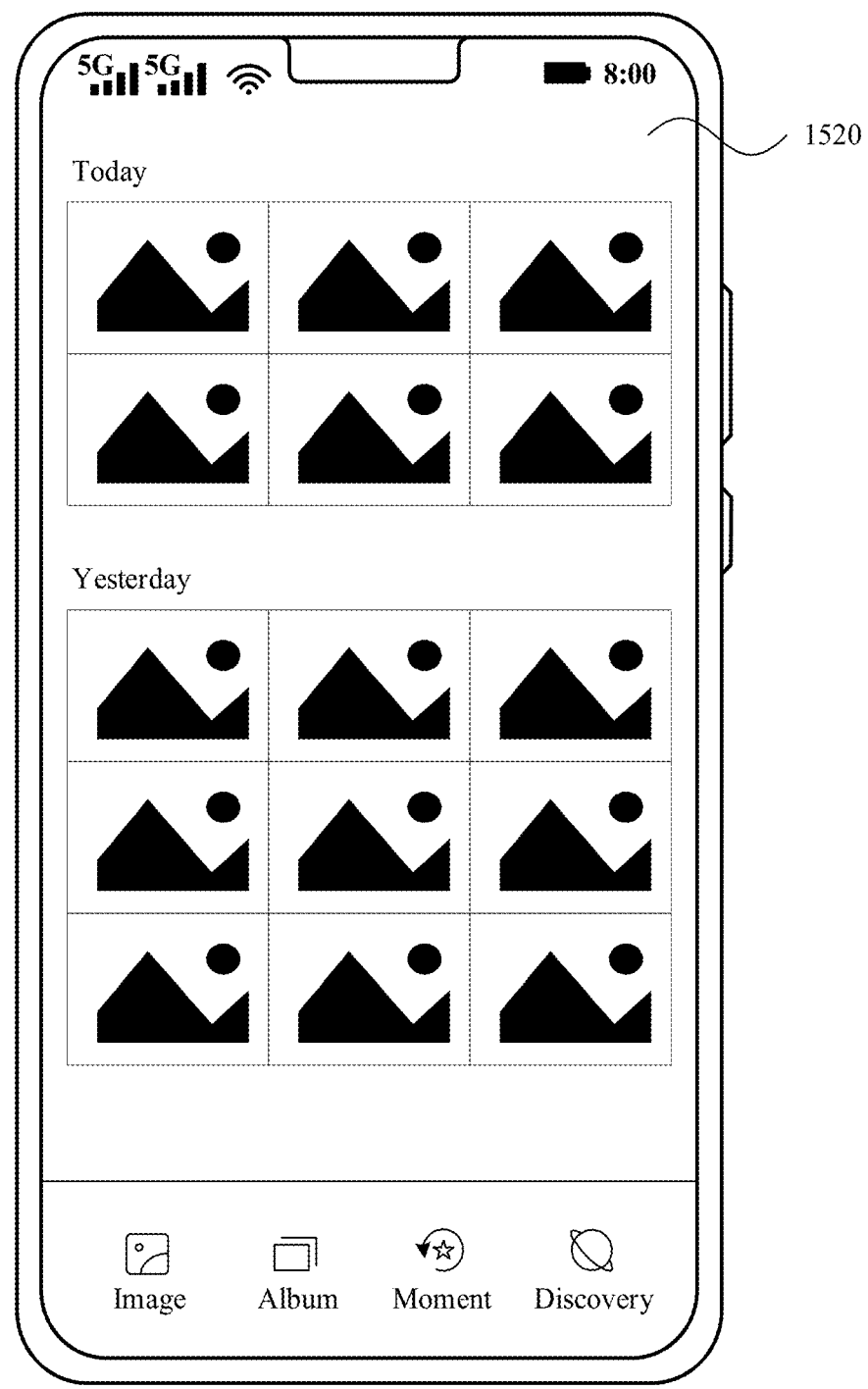

In some other embodiments, the compressed application may be first decompressed, and after the decompression is completed, the application is started to enter an application interface. In other words, the user can view the application decompression process and use the application after the decompression is completed. For example, as shown in FIG. 16A to FIG. 16C, it is assumed that the mobile phone 100 displays a home screen 1500 shown in FIG. 16A, and a Gallery application on the home screen 1500 is a compressed application. After the user taps an application icon of the compressed Gallery, the mobile phone 100 may respond to the operation and decompress the Gallery application. For example, an interface 1510 shown in FIG. 16B may be displayed. The interface 1510 may include Gallery decompression prompt information 1511. After the decompression is completed, the Gallery application may be started, and an application interface of the Gallery is displayed. For example, an interface 1520 shown in FIG. 16C is displayed.

The method for compressing or decompressing an application in the foregoing examples may further include: changing a compression manner of a compressed application in response to an operation performed by the user on an application icon of the compressed application. For example, the compressed application is the Gallery application, and the Gallery application is an application on which light compression is performed. The user may touch and hold an application icon of the Gallery application to change the light compression manner to a medium compression manner and perform medium compression on the Gallery application. Then, the user may touch and hold an application icon of the Gallery application on which the medium compression is performed, change the medium compression manner to a heavy compression manner, and perform heavy compression on the Gallery application. In this way, the user may adjust the compression manner based on a requirement of the user. This can improve user experience.

It should be understood that the foregoing change of the compression manner is merely an example for description. The compression manner in embodiments may be randomly switched. For example, the compression manner may be changed from the light compression manner to the heavy compression manner, or may be changed from the medium compression manner to the light compression manner, and then from the light compression manner to the heavy compression manner. This is not limited in this disclosure.

In the foregoing embodiments provided in this disclosure, the method provided in embodiments is described from a perspective of an electronic device serving as an execution body. To implement functions in the foregoing methods provided in embodiments, the electronic device may include a hardware structure and/or a software module, and the foregoing functions are implemented in a form of a hardware structure, a software module, or a combination of a hardware structure and a software module. Whether a function in the foregoing functions is performed by using the hardware structure, the software module, or the combination of the hardware structure and the software module depends on particular applications and design constraint conditions of the technical solutions.

Figure 17:
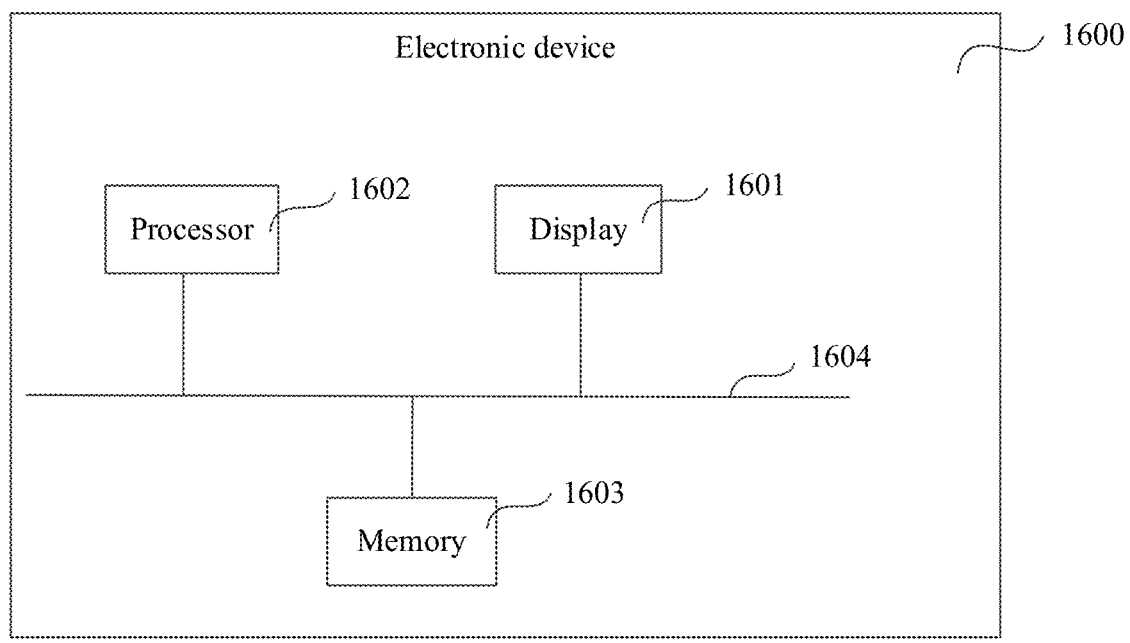
FIG. 17 is a diagram of a structure of another electronic device according to an embodiment.

As shown in FIG. 17, some other embodiments disclose an electronic device. The electronic device may be an electronic device having a display. Refer to FIG. 17. The electronic device 1600 includes a display 1601, one or more processors 1602, one or more memories 1603, one or more sensors (not shown in the figure), a plurality of applications (not shown in the figure), and one or more computer programs (not shown in the figure). The foregoing components may be connected through one or more communication buses 1604.

The display 1601 is configured to display a display interface of an application in the electronic device, or display prompt information. The memory 1603 stores one or more computer programs, and the one or more computer programs include instructions. The processor 1602 invokes the instructions stored in the memory 1603, so that the electronic device 1600 can implement the application compression method and the application decompression method in the foregoing embodiments.

In embodiments, the processor 1602 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments. The general-purpose processor may be a microprocessor or any processor or the like. The steps of the methods disclosed with reference to embodiments may be directly performed by a hardware processor, or may be performed by using a combination of hardware in the processor and a software module. The software module may be located in the memory 1603. The processor 1602 reads the program instructions from the memory 1603, and completes the steps of the foregoing methods in combination with the hardware of the processor.

In embodiments, the memory 1603 may be a non-volatile memory, for example, a hard disk drive (HDD) or a solid-state drive (SSD), or may be a volatile memory, for example, a RAM. The memory may alternatively be any other medium that can be used to carry or store expected program code in a form of an instruction or a data structure and that can be accessed by a computer, but is not limited thereto. The memory in embodiments may alternatively be a circuit or any other apparatus that can implement a storage function, and is configured to store the instructions and/or the data.

It may be clearly understood by a person skilled in the art that, for the purpose of convenient and brief description, for a detailed working process of the foregoing apparatus and unit, refer to a corresponding process in the foregoing method embodiments. Details are not described herein again.

Based on the foregoing embodiments, this disclosure further provides a computer storage medium. The computer storage medium stores a computer program, and when the computer program is executed by a computer, the computer is enabled to perform the application compression method and the application decompression method that are provided in the foregoing embodiments.

An embodiment further provides a computer program product, including instructions. When the computer program product runs on a computer, the computer is enabled to perform the application compression method and the application decompression method that are provided in the foregoing embodiments.

Embodiments are described with reference to the flowcharts and/or block diagrams of the method, the device (the system), and the computer program product according to embodiments. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that instructions executed by the computer or the processor of the another programmable data processing device generate an apparatus for implementing a function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more processes in the flowcharts and/or in one or more blocks in the block diagrams.

What is claimed is:

1. A method comprising:
    displaying a first interface, wherein the first interface comprises an application icon and a compression option; and
    performing, in response to a first operation on the application icon and a second operation on the compression option, transparent compression on an application corresponding to the application icon to obtain a compressed target application, wherein performing the transparent compression comprises:
        selecting a target file from application files of the application;
        dividing the target file into a plurality of file blocks based on a predetermined block size threshold and content type of data in each block;

selecting corresponding target compression algorithms for the plurality of file blocks, wherein the selection is based on a determination of an optimal compression ratio for each file block predicted using a block-specific data analysis; and compressing the plurality of file blocks according to the corresponding target compression algorithms.

2. The method of claim 1, further comprising displaying a second interface comprising first prompt information indicative of compression progress of the transparent compression.

3. The method of claim 1, wherein performing the transparent compression further comprises:

obtaining a first file corresponding to the target application, wherein the first file comprises first data; and compressing the first data in the first file to obtain a second file, wherein the second file comprises first compressed data, and wherein a file name and an extension name of the first file are the same as those of the second file.

4. The method of claim 1, further comprising changing a compression manner of the target application in response to a third operation on the compression option.

5. The method of claim 1, further comprising displaying a third interface comprising the application icon of the compressed target application.

6. The method of claim 5, further comprising:

displaying third prompt information in response to a fourth operation on the third interface, wherein the third prompt information comprises information indicating that the target application is being decompressed;

starting, after the target application is decompressed, the target application; and displaying an application interface of the target application.

7. The method of claim 5, further comprising:

starting the target application in response to a fifth operation on the third interface; and displaying an application interface of the target application.

8. The method of claim 5, further comprising:

displaying a fourth interface in response to a sixth operation on the third interface, wherein the fourth interface comprises a decompression option; and performing, in response to a seventh operation on the decompression option, decompression on the target application.

9. The method of claim 8, wherein decompressing the target application comprises:

obtaining a second file corresponding to the target application, wherein the second file comprises first compressed data of first data, and wherein the first data is in a first file in the target application; and decompressing the first compressed data in the second file to obtain the first file, wherein a file name and an extension name of the first file are the same as those of the second file.

10. The method of claim 8, further comprising displaying a fifth interface, wherein the fifth interface comprises second prompt information, and wherein the second prompt information indicates decompression progress of the decompression.

11. An application decompression method, comprising:

displaying a sixth interface comprising an icon of a transparently-compressed target application and a decompression option comprising a decompression button associated with a target application;

performing, in response to an eighth operation on the icon of the transparently-compressed application, wherein the eighth operation comprises a user selecting the target application by performing a touch and hold gesture or tapping a selection box;

performing a ninth operation on the decompression option comprising tapping the decompression button;

performing, in response to the ninth operation, transparent decompression on the transparently-compressed target application corresponding to the icon of the transparently-compressed target application to obtain a decompressed target application, wherein the decompression comprises displaying decompression progress; and launching the decompressed target application or returning to a home screen interface.

12. The method of claim 11, further comprising decompressing a plurality of transparently-compressed target applications in response to a tenth operation on the a plurality of target application icons corresponding to a plurality of transparently-compressed applications.

13. An electronic device, comprising:

one or more memories configured to store instructions; and one or more processors coupled to the one or more memories and configured to execute the instructions to cause the electronic device to:

display a first interface, wherein the first interface comprises an application icon and a compression option; and perform, in response to a first operation on the application icon and a second operation on the compression option, transparent compression on an application corresponding to the application icon to obtain a compressed target application, wherein performing the transparent compression comprises:

selecting a target file from application files of the application;

dividing the target file into a plurality of file blocks based on a predetermined block size threshold and content type of data in each block;

selecting corresponding target compression algorithms for the plurality of file blocks, wherein the selection is based on a determination of an optimal compression ratio for each file block predicted using a block-specific data analysis; and compressing the plurality of file blocks according to the corresponding target compression algorithms.

14. The electronic device of claim 13, wherein the instructions further cause the electronic device to:

display a second interface comprising first prompt information indicative of compression progress of the transparent compression; and display a third interface comprising an application icon of the compressed target application.

15. The electronic device of claim 13, wherein the instructions further cause the electronic device to:

display a fourth interface in response to a sixth operation on a third interface, wherein the fourth interface comprises a decompression option;

decompress the target application in response to a seventh operation on the decompression option; and display a fifth interface, wherein the fifth interface comprises second prompt information, and wherein the second prompt information indicates decompression progress of the target application.

16. The electronic device of claim 15, wherein the instructions further cause the electronic device to:
- start the target application in response to a fifth operation on the third interface; and
- display an application interface of the target application.

17. The electronic device of claim 15, wherein the instructions further cause the electronic device to:
- display third prompt information in response to a fourth operation on the third interface, wherein the third prompt information comprises information indicating that the target application is being decompressed;
- after the target application is decompressed, start the target application; and
- display an application interface of the target application.

18. The electronic device of claim 13, wherein the instructions further cause the electronic device to change a compression manner of the target application in response to a third operation performed on the compression option.

19. The electronic device of claim 13, wherein the instructions further cause the electronic device to display a second interface comprising prompt information indicative of compression progress of the transparent compression.

20. The electronic device of claim 13, wherein the instructions further cause the electronic device to display a third interface comprising an application icon corresponding to the compressed target application.

* * * * *